United States Patent
Irukulapati et al.

(10) Patent No.: US 12,101,728 B2
(45) Date of Patent: *Sep. 24, 2024

(54) CONFIGURATION OF ADDITIONAL SYNCHRONIZATION SIGNAL

(71) Applicant: Telefonaktiebolaget LM Ericsson (PUBL), Stockholm (SE)

(72) Inventors: Naga Vishnu Kanth Irukulapati, Västra Frölunda (SE); Andres Reial, Malmö (SE); Henrik Sahlin, Mölnlycke (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/875,588

(22) Filed: Jul. 28, 2022

(65) Prior Publication Data

US 2022/0369252 A1 Nov. 17, 2022

Related U.S. Application Data

(63) Continuation of application No. 16/639,785, filed as application No. PCT/SE2018/050877 on Aug. 31, 2018, now Pat. No. 11,405,879.

(Continued)

(51) Int. Cl.
*H04W 56/00* (2009.01)
*H04B 17/336* (2015.01)
(Continued)

(52) U.S. Cl.
CPC ........ *H04W 56/001* (2013.01); *H04B 17/336* (2015.01); *H04W 68/005* (2013.01); *H04W 72/30* (2023.01); *H04W 76/28* (2018.02)

(58) Field of Classification Search
CPC . H04W 72/23; H04W 72/231; H04W 72/232; H04W 72/30; H04W 72/0446;
(Continued)

(56) References Cited

U.S. PATENT DOCUMENTS

2014/0220960 A1   8/2014   Nagel et al.
2015/0043545 A1   2/2015   Cheng et al.
(Continued)

FOREIGN PATENT DOCUMENTS

WO   2015 065283 A1   5/2015
WO   2015 116940 A1   8/2015

OTHER PUBLICATIONS

3GPP TSG-RAN WG1 NR AD-HOC #2; Qingdao, China; Source: Ericsson; Title: 4-step random access procedure (R1-1711383)—Jun. 27-30, 2017.

(Continued)

*Primary Examiner* — Peter Chen
(74) *Attorney, Agent, or Firm* — Baker Botts L.L.P.

(57) ABSTRACT

According to certain embodiments, a method in a network node comprises determining (1306) whether an additional synchronization signal should be transmitted to one or more wireless devices. The method further comprises transmitting (1308) an indication whether the additional synchronization signal is available for use. For example, in response to determining that the additional synchronization signal should be transmitted, the indication signals a presence of the additional synchronization signal to the one or more wireless devices.

4 Claims, 19 Drawing Sheets

Related U.S. Application Data

(60) Provisional application No. 62/552,626, filed on Aug. 31, 2017.

(51) Int. Cl.
*H04W 68/00* (2009.01)
*H04W 72/30* (2023.01)
*H04W 76/28* (2018.01)

(58) Field of Classification Search
CPC .......... H04W 72/0453; H04W 56/001; H04W 68/02; H04W 68/005; H04W 76/28; H04W 74/006; H04L 5/0053; H04L 5/0048; H04L 5/0051; H04L 5/0007; H04B 17/336; H04B 17/345
See application file for complete search history.

(56) References Cited

U.S. PATENT DOCUMENTS

| | | |
|---|---|---|
| 2017/0353254 A1 | 12/2017 | Islam et al. |
| 2018/0199363 A1* | 7/2018 | Lee ...................... H04W 76/27 |
| 2018/0288737 A1* | 10/2018 | Islam .................... H04W 72/23 |
| 2020/0045663 A1 | 2/2020 | Manolakis et al. |

OTHER PUBLICATIONS

3GPP TSG-RAN WG1 NR AD-HOC #2; Qingdao, China; Source: Ericsson; Title: Additional synchronization provision (R1-1711388)—Jun. 27-30, 2017.
3GPP TSG-RAN WG1 Meeting #90; Prague, Czech Republic; Source: Ericsson; Title: Additional synchronization provision (R1-1714048)—Aug. 21-25, 2017.
PCT International Search Report issued for International application No. PCT/SE2018/050877—Dec. 27, 2018.
PCT Written Opinion of the International Searching Authority for International application No. PCT/SE2018/050877—Dec. 27, 2018.

* cited by examiner

CONFIGURATION OF ADDITIONAL SYNCHRONIZATION SIGNAL

PRIORITY

This nonprovisional application is a continuation, under 35 U.S.C. § 120, of U.S. patent application Ser. No. 16/639,785 filed on Feb. 18, 2020, now issued as U.S. Pat. No. 11,405,879, which is a U.S. National Stage Filing under 35 U.S.C. § 371 of International Patent Application Serial No. PCT/SE2018/050877 filed Aug. 31, 2018, and entitled "Configuration of Additional Synchronization Signal" which claims priority to U.S. Provisional Patent Application No. 62/552,626 filed Aug. 31, 2017, all of which are hereby incorporated by reference in their entirety.

TECHNICAL AREA

Embodiments of the present disclosure relate generally to wireless communications and, more particularly, to network synchronization signaling.

BACKGROUND

The 3rd Generation Partnership Project (3GPP) is in the process of developing the next generation of technical specifications for wireless communication between wireless devices and base stations. The next generation of technical specifications may be referred to as New Radio (NR). Wireless devices in NR may be referred to as user equipment (UE), and base stations in NR may be referred to as access nodes, network nodes, next generation Node Bs (gNBs), or Transmission and Reception Points (TRPs), for example.

In order to connect to a network, a wireless device needs to acquire network synchronization and obtain essential system information (SI). Synchronization signals are used for adjusting the frequency of the device relative to the network and for finding the proper timing of the received signal from the network. In NR, the synchronization and access procedure may involve several signals, including but not limited to:

NR-primary synchronization signal (NR-PSS): allows for network detection in the presence of a high initial frequency error, up to tens of parts per million (ppm). Additionally, NR-PSS provides a network timing reference. 3GPP has selected three m-sequences as NR-PSS signals. Since the use of one out of three sequences is known but the channel is unknown, the NR-PSS is typically detected by correlation between the received signal and all three possible m-sequences. A correlation value above a threshold typically indicates the presence of an NR-PSS that the UE can synchronize to. In order to handle initially large frequency offsets arising from a non-synchronized (open-loop) mode of the local oscillator (LO), multiple correlations may be needed hypothesizing over multiple, different frequency errors to cover the whole range of frequency errors.

NR-secondary synchronization signal (NR-SSS): allows for more accurate frequency adjustments beyond the frequency alignment obtained from using the NR-PSS and channel estimation while at the same time providing fundamental network information, such as cell ID. Also here, m-sequences are used and detection is similar to that of NR-PSS.

NR-physical broadcast channel (NR-PBCH): provides a subset of the minimum SI for random access. NR-PBCH also provides timing information within a cell, for example, to separate timing between beams transmitted from a cell. The amount of information to fit into the NR-PBCH is highly limited to keep the size and power allocation down. Furthermore, demodulation reference signals are injected in the NR-PBCH in order to receive and decode it properly.

A synchronization signal block (SSB): as proposed for NR, SSB comprises the above signals (NR-PSS, NR-SSS, NR-PBCH). In NR, the SSB transmission scheme is under discussion. FIG. 1 illustrates a proposed composition/structure of an SSB comprising the NR-PSS, NR-SSS, and NR-PBCH.

In FIG. 1, two Orthogonal Frequency Domain Multiplexing (OFDM) symbols are reserved for NR-PBCH transmission. NR-PSS and NR-SSS are defined to be 127 subcarriers wide, whereas the NR-PBCH is defined to be 288 subcarriers wide. A number of (typically rather close in time) SSBs constitute a synchronization signal (SS) burst, an example of which is shown in FIG. 2. The SS burst is repeated periodically, such as every 20 ms. The UE can use the SS blocks in the SS burst to determine the downlink timing and acquire some fundamental system information from the NR-PBCH. An NR UE in idle mode can expect an SS burst transmitted once per 20 ms (in connected mode the UE can be configured to expect SS burst once per 5 ms). Hence, once the UE has obtained downlink synchronization, it knows in which slots to expect SSB transmissions.

Random Access Procedure

A random access (RA) procedure is a key function in a cellular system. In long term evolution (LTE), a UE that would like to access the network initiates the random access procedure by transmitting a preamble (Msg1) in the uplink on the Physical Random Access Channel (PRACH). A base station receiving the preamble and detecting the random-access attempt will respond in the downlink by transmitting a random access response (RAR, Msg2). The RAR carries an uplink scheduling grant for the UE to continue the procedure by transmitting a subsequent message in the uplink (Msg3) for terminal identification.

NR uses a similar random access procedure as LTE. An example of a random access procedure for NR is illustrated in FIG. 3A. Before transmission of the PRACH preamble, the UE receives both a set of synchronization signals and configuration parameters over a broadcast transmission of an SS-block (for example, NR-PSS, NR-SSS, NR-PBCH), possibly complemented with configuration parameters received on yet another SI channel, for example, remaining minimum system information (RMSI) transmitted using New Radio Physical Downlink Control Channel (NR-PDCCH)/New Radio Physical Downlink Shared Channel (NR-PDSCH). Examples of NR-RACH formats are illustrated in FIG. 3B (preamble formats for NR-RACH).

Paging Procedure

Paging is used to inform UEs in idle or inactive state about the need to connect to the network, or to signal updated SI or emergency messages. In LTE, paging is delivered like any downlink data using the PDCCH and the PDSCH. The paging message, transmitted on the PDSCH, is allocated transmission resources by a scheduling assignment on the PDCCH addressed to the paging radio network temporary identifier (P-RNTI) (which is shared by all UEs). The delivery channel is cell-specific, since both the reference signals (e.g., cell specific reference signals, CRS) and the scrambling are derived from the physical cell identity (PCI).

In NR, the paging message is scheduled by downlink control information (DCI) transmitted on an NR-PDCCH and the paging message is then transmitted on the associated NR-PDSCH. NR is expected to support the same paging principles as in LTE (i.e., delivering paging on a physical channel where the information needed to demodulate the physical channel can be derived from the camping cell PCI).

The paging furthermore needs to support variable payload, at least since the UE IDs used for paging may be of variable size and paging of multiple UEs during one paging occasion needs to be supported to allow long network discontinuous transmission (DTX). It is estimated that the paging payload can be from 10-20 bits for paging a single UE up to several hundred information bits for paging multiple UEs or emergency message transmission, and hence the format needs to support at least such payload variations.

PDCCH and Other Signal Reception

In LTE, RAR, paging, and other broadcasted SI is carried over PDCCH and PDSCH. Similar to LTE, in NR these signaling types may be carried over NR-PDCCH and NR-PDSCH. Based on current simulations using a baseline OFDM receiver, reliable NR-PDCCH reception requires timing accuracy of about 80% of the cyclic prefix (CP) length and frequency accuracy of approximately 5v % of the subcarrier spacing (SCS). In standard deployments, this offers a sufficient margin given that NR-PSS/NR-SSS detection typically ensures frequency accuracy within 2% of SCS and just a few time samples.

However, in some scenarios, additional timing or frequency uncertainties are introduced that will cause problems with NR-PDCCH reception. Some examples of such scenarios are single frequency network (SFN) transmission of either SSB or the NR-PDCCH, silent node deployments where not all nodes transmit SSB but may transmit NR-PDCCH, long SSB periods and related long delay between SSB and NR-PDCCH transmission, etc. The additional uncertainties accumulate on top of the initial synchronization errors and may, alone or together, result in excessive misalignment at the time of NR-PDCCH demodulation so that NR-PDCCH reception performance is impossible or critically degraded.

Another class of scenarios where SSB-based synchronization may not be sufficient is channel state information-reference signal (CSI-RS)-based reference signal received power (RSRP) measurements to support inter-cell mobility. In deployments where neighbor-cell SSB is not received with a sufficient quality (for example, due to low relative signal strength compared to a narrow beam-formed data signal) or is not representative of the CSI-RS-transmitting cell in the quasi co-located (QCL) sense (in SFN-SSB or silent node deployments), the CSI-RS-based measurements may be unreliable or impossible.

Such misalignment problems can arise, for example, in RAR reception, paging, remaining minimum system information (RMSI) distribution, and/or CSI-RS RSRP measurements for active mode mobility.

There are a number of technical issues present with network synchronization. In LTE, the downlink control channel is demodulated with the use of cell specific reference signals (CRS for PDCCH) or UE specific demodulation reference signals (DMRS for enhanced physical downlink control channel (EPDCCH) and physical uplink control channel (PUCCH)). These CRS are always transmitted and consume a large fraction of radio resources. The DMRS are only transmitted to a specific UE, or group of UEs, but are not suited as a synchronization signal. This leads to inaccurate timing and/or frequency estimates in scenarios described in the above section. If, on the other hand, an additional synchronization signal is always present to aid the synchronization, as discussed in some NR scenarios, this leads to inefficient use of resources in many conventional deployments and also increases UE complexity due to always performing the additional synchronization procedure. Furthermore, if the use of additional synchronization signal is configured uniformly for all UEs regardless whether they need it or not, the UE and/or network operation may be inefficient.

SUMMARY

As discussed above, in certain scenarios, existing methods of network synchronization may consume significant radio resources or may cause inaccurate synchronization. Instead of individually addressing all scenarios where synchronization for NR-PDCCH reception is insufficient, this issue may be overcome by introducing an additional dynamically configurable synchronization signal. The UE would then first use the additional synchronization signal to obtain time and frequency synchronization for NR-PDCCH reception, prior to demodulating the control information. Using a signal similar to NR-PSS for such flexible synchronization provision is discussed herein. To address these and other problems, a gNB decides whether to configure the additional synchronization signal to aid NR-PDCCH (or other control signal) reception. The decision may apply to individual UEs, different UE category groups, or all UEs in the coverage area. In some embodiments, the decision whether to configure the additional synchronization signal may depend on one or more of aspects like deployment parameters, UE position and movement parameters, current NR-PDCCH and SSB configuration, NR-PDCCH reception criteria, and other aspects that may arise in different scenarios. The network node then signals the presence or lack of the additional synchronization signal to the UE. For example, depending on the NR-PDCCH reception context, it may be done via one or more designated bits in NR-PBCH or RMSI data sets, via dedicated control signaling (e.g., using radio resource control (RRC)), via dedicated L1 signaling (e.g., using DCI), or other approaches.

In certain embodiments of the present disclosure, the UE receives the additional synchronization signal configuration information (e.g., an indication from the network node), for example via NR-PBCH, RMSI, RRC signaling, and/or DCI. If the additional synchronization signal is configured, the UE may detect the signal by searching for predetermined signatures at different time and frequency synchronization grid settings and, upon detection, the UE may demodulate the NR-PDCCH using the appropriate time and frequency settings. If no additional synchronization signal is configured, the UE relies on SSB synchronization for NR-PDCCH decoding.

According to some embodiments, a method in a network node comprises determining whether an additional synchronization signal should be transmitted to one or more wireless devices. The method further transmitting, to the one or more wireless devices, an indication whether the additional synchronization signal is available for use. For example, in response to determining that the additional synchronization signal should be transmitted, the indication signals a presence of the additional synchronization signal to the one or more wireless devices. Alternatively, in response to determining that the additional synchronization signal should not be transmitted, the indication signals a lack of the additional synchronization signal to the one or more wireless devices.

According to some embodiments, a network node comprises processing circuitry and an interface operably coupled to the processing circuitry. The processing circuitry is configured to determine whether an additional synchronization signal should be transmitted to one or more wireless devices. The interface is configured to transmit, to the one or more wireless devices, an indication whether the additional synchronization signal is available for use.

According to some embodiments, a computer program product comprises a non-transitory computer readable medium storing computer readable program code. The computer readable program code, when executed by processing circuitry of a network node, causes the network node to determine whether an additional synchronization signal should be transmitted to one or more wireless devices and to transmit an indication to one or more wireless devices. The indication indicates whether the additional synchronization signal is available for use.

The network node, the computer program product, and/or the method performed in the network node may include one or more of the following additional features:

In some embodiments, an SSB is transmitted to one or more of the wireless devices. The SSB comprises information that the one or more wireless devices can use for synchronization. In some embodiments, the additional synchronization signal is transmitted to one or more of the wireless devices. The additional synchronization signal comprises additional information that the one or more wireless devices can use for synchronization. In some embodiments, the SSB comprises a first m-sequence (which may be the PSS) and the additional synchronization signal comprises a second m-sequence of a same length as the first m-sequence but generated from a different generator state.

In some embodiments, transmitting the indication comprises broadcasting the indication to the one or more wireless devices.

In some embodiments, transmitting the indication to the one or more wireless devices comprises transmitting the indication using an MIB field in an SSB.

In some embodiments, transmitting the indication to the one or more wireless devices comprises transmitting the indication using one or more bits in an RMSI field.

In some embodiments, transmitting the indication to the group of wireless devices comprises transmitting the indication using dedicated control signaling. In some embodiments, the dedicated control signaling comprises RRC signaling.

In some embodiments, transmitting the indication to the one or more wireless devices comprises transmitting the indication within DCI transmitted in a PDCCH. In some embodiments, the indication indicates that a PDSCH is allocated with an additional RAR synchronization signal.

In some embodiments, transmitting the indication to the one or more wireless devices comprises transmitting an NR-PDCCH in a special control signaling search region. In some embodiments, the special control signaling search region corresponds to a predefined set of resources from which the one or more wireless devices can infer that the additional synchronization signal is configured. In some embodiments, the predefined set of resources are PDCCH resource elements.

In some embodiments, determining whether the additional synchronization signal should be transmitted is based at least in part on position and movement parameters of the one or more wireless devices.

In some embodiments, determining whether the additional synchronization signal should be transmitted to the one or more wireless devices is based at least in part on a current configuration of an NR-PDCCH of the network node and/or a current configuration of an SSB of the network node.

In some embodiments, determining whether the additional synchronization signal should be transmitted is based at least in part on one or more network deployment parameters. In some embodiments, the one or more network deployment parameters comprise at least one of a parameter indicating whether the network node is a silent node, a parameter indicating whether the network node is participating in an SFN transmission, and/or a parameter related to Doppler spread.

In some embodiments, determining whether the additional synchronization signal should be transmitted is based at least in part on receiving a request from at least one of the wireless devices. The request indicates that the network node should transmit the additional synchronization signal. In some embodiments, the request comprises a PRACH preamble associated with an index that implicitly indicates the request for the network node to provide the additional synchronization signal. Certain embodiments further comprise transmitting the additional synchronization signal to the wireless device from which the network node received the PRACH preamble having the index that implicitly indicates the request for the additional synchronization signal. The additional synchronization signal is transmitted using a RAR.

In some embodiments, the method, network node, or computer program product transmit, to the one or more wireless devices, information indicating a subset of PRACH preamble indices that can be used by the one or more wireless devices to request the additional synchronization signal.

In some embodiments, the indication of additional synchronization signals is configured to be different for different SSBs such that the indication of additional synchronization signals received by one of the wireless devices depends on which of the SSBs is detected by that wireless device.

In some embodiments, the method, network node, or computer program product determines the one or more wireless devices to which the additional synchronization signal is to be transmitted. In some embodiments, the determination is based at least in part on one or more of the following: a mobility property of the group of wireless devices, one or more hardware limitations of the one or more wireless devices, a link budget of the one or more wireless devices, energy limitations of the one or more wireless devices, proximity to the network node or other transmitting units of the one or more wireless devices, and/or a predetermined RACH preamble configuration used by one or more of the wireless devices within a coverage area of the network node (such as format B4, in some embodiments).

In some embodiments, the method, network node, or computer program product transmits the additional synchronization signal to the one or more wireless devices. In some embodiments, transmitting the additional synchronization signal comprises transmitting the additional synchronization signal in one or more subsequent RAR windows, the one or more subsequent RAR windows occurring after a first RAR window. In some embodiments, configuration of the one or more subsequent RAR windows is broadcast in RMSI.

In some embodiments, the indication further signals a type of the additional synchronization signal. In some embodiments, the type of the additional synchronization signal is a synchronization sequence used. In some embodiments, the synchronization sequence used is a synchronization that shares its design with an SSB synchronization but deviates from the SSB synchronization in one or more of a specific sequence or a frequency allocation.

In some embodiments, the one or more wireless devices correspond to a synchronization selection group ID and the network node transmits the additional synchronization signal to the one or more wireless devices based at least in part on the synchronization selection group ID.

In some embodiments, the one or more wireless devices comprises a subset of wireless devices in a coverage area of the network node.

In some embodiments, the group of wireless devices comprises all wireless devices in a coverage area of the network node.

In some embodiments, transmitting the indication to the one or more wireless devices comprises transmitting the indication during paging.

In some embodiments, transmitting the indication to the one or more wireless devices comprises transmitting the indication during a discontinuous receive (DRX) phase.

In some embodiments, transmitting the additional synchronization signal to the wireless device enables the wireless device to use the additional synchronization signal when performing a measurement of CSI-RS.

According to some embodiments, a method is disclosed for use in a wireless device. The method comprises receiving an indication from a network node. The indication indicates whether an additional synchronization signal is available for use. In response to receiving an indication that the additional synchronization signal is available for use, the method comprises performing synchronization using the additional synchronization signal. In response to receiving an indication that the additional synchronization signal is not available for use, the method comprises performing synchronization without the additional synchronization signal.

According to some embodiments, a wireless device comprises an interface and processing circuitry operably coupled to the interface. The interface is configured to receive an indication from a network node. The indication indicates whether an additional synchronization signal is available for use. The processing circuitry is configured to perform synchronization using the additional synchronization signal (in response to receiving an indication that the additional synchronization signal is available for use) or without the additional synchronization signal (in response to receiving an indication that the additional synchronization signal is not available for use).

According to some embodiments, a computer program product comprises a non-transitory computer readable medium storing computer readable program code. The computer readable program code, when executed by processing circuitry of a wireless device, causes the wireless device to receive an indication from a network node. The indication indicates whether an additional synchronization signal is available for use. The computer readable program code, when executed by processing circuitry of the wireless device, further causes the wireless device to perform synchronization using the additional synchronization signal (in response to receiving an indication that the additional synchronization signal is available for use) or without the additional synchronization signal (in response to receiving an indication that the additional synchronization signal is not available for use).

The wireless device, the computer program product, and/or the method performed in the wireless device may include one or more of the following additional features:

In some embodiments, the synchronization comprises decoding a channel that has been transmitted by the network node.

In some embodiments, an SSB comprising information that the wireless device can use for performing the synchronization is received from the network node. In some embodiments, the additional synchronization signal is received from the network node and comprises additional information that the wireless device can use for performing the synchronization.

In some embodiments, the indication whether the additional synchronization signal is available for use is received via broadcast signaling. As examples, the indication whether the additional synchronization signal is available for use is received in an MIB field of an SSB, or in an RMSI field.

In some embodiments, the indication whether the additional synchronization signal is available for use is received in dedicated control signaling. As an example, the dedicated control signaling comprises RRC signaling.

In some embodiments, the indication whether the additional synchronization signal is available for use is received in DCI that is received via a PDCCH. In some embodiments, the indication indicates that a PDSCH is allocated with an additional RAR synchronization signal.

In some embodiments, the indication whether the additional synchronization signal is available for use is received in a special control signaling search region of an NR-PDCCH. As an example, the special control signaling search region corresponds to a predefined set of resources (such as PDCCH resource elements) from which the wireless devices can infer that the additional synchronization signal is configured.

In some embodiments, a determination is made whether to request the additional synchronization signal from the network node. The determination is based at least in part on one or more of an estimated speed or Doppler spread of the wireless device, an SNR or SINR associated with the wireless device, a frequency offset estimate, or an estimation of timing or frequency offset variance.

In some embodiments, the method, wireless device, or computer program product transmits a request to the network node. The request indicates that the network node should transmit the additional synchronization signal. As an example, the request comprises a PRACH preamble associated with an index that implicitly indicates the request for the network node to provide the additional synchronization signal.

In some embodiments, the method, wireless device, or computer program product receives the additional synchronization signal in a RAR from the network node. In some embodiments, the RAR is received in one or more subsequent RAR windows occurring after a first RAR window. In some embodiments, configuration of the one or more subsequent RAR windows is received in RMSI broadcast by the network node.

In some embodiments, the method, wireless device, or computer program product receives information from the network node that indicates a subset of PRACH preamble indices that can be used by the wireless device to request the additional synchronization signal.

In some embodiments, the method, wireless device, or computer program product determines whether the wireless device belongs to a group of wireless devices for which the additional synchronization signal is available. As examples, whether the wireless device belongs to the group depends at least in part on one or more of the following: a synchronization selection group ID of the wireless device, a mobility property of the wireless devices, one or more hardware limitations of the wireless device, a link budget of the wireless device, energy limitations of the wireless device, proximity of the wireless device to the network node or other transmitting units, or a predetermined RACH preamble configuration used by the wireless device (such as format B4).

In some embodiments, the indication whether an additional synchronization signal is available for use further signals a type of the additional synchronization signal. As an example, the type of the additional synchronization signal is a synchronization sequence used. In some embodiments, the synchronization sequence used is a synchronization that shares its design with an SSB synchronization but deviates from the SSB synchronization in one or more of a specific sequence or a frequency allocation.

In some embodiments, the SSB comprises a first m-sequence (which may be the PSS) and the additional synchronization signal comprises a second m-sequence of a same length as the first m-sequence but generated from a different generator state.

In some embodiments, the indication is received during paging.

In some embodiments, the indication is received during a DRX phase.

In some embodiments, the additional synchronization signal is used when performing a measurement of CSI-RS.

Certain embodiments of the present disclosure may provide additional technical advantages. An advantage of certain embodiments is that by making the additional synchronization signal configuration flexible and applying it when required by deployment parameters or other relevant aspects, and to the UEs or UE groups that require it, gNB can use this mode when it is necessary to ensure robust control channel (for example, NR-PDCCH) reception in system access procedures, as well as possibly the subsequent NR-PDSCH decoding, and when the SSB-based synchronization may not yield sufficient time or frequency alignment. When there is no necessity of sending the additional synchronization signal, the efficiency of using network signaling is not reduced by an additional signal. As another example, an advantage of certain embodiments is that from the UE perspective, the UE will only detect this additional synchronization signal when it is needed to have better time and frequency synchronization. The decision of transmitting a synchronization signal is left to the gNB but may be communicated to the UE, thereby not affecting UE complexity in scenarios where conventional synchronization is based on SSB.

BRIEF DESCRIPTION

Figure 4A:
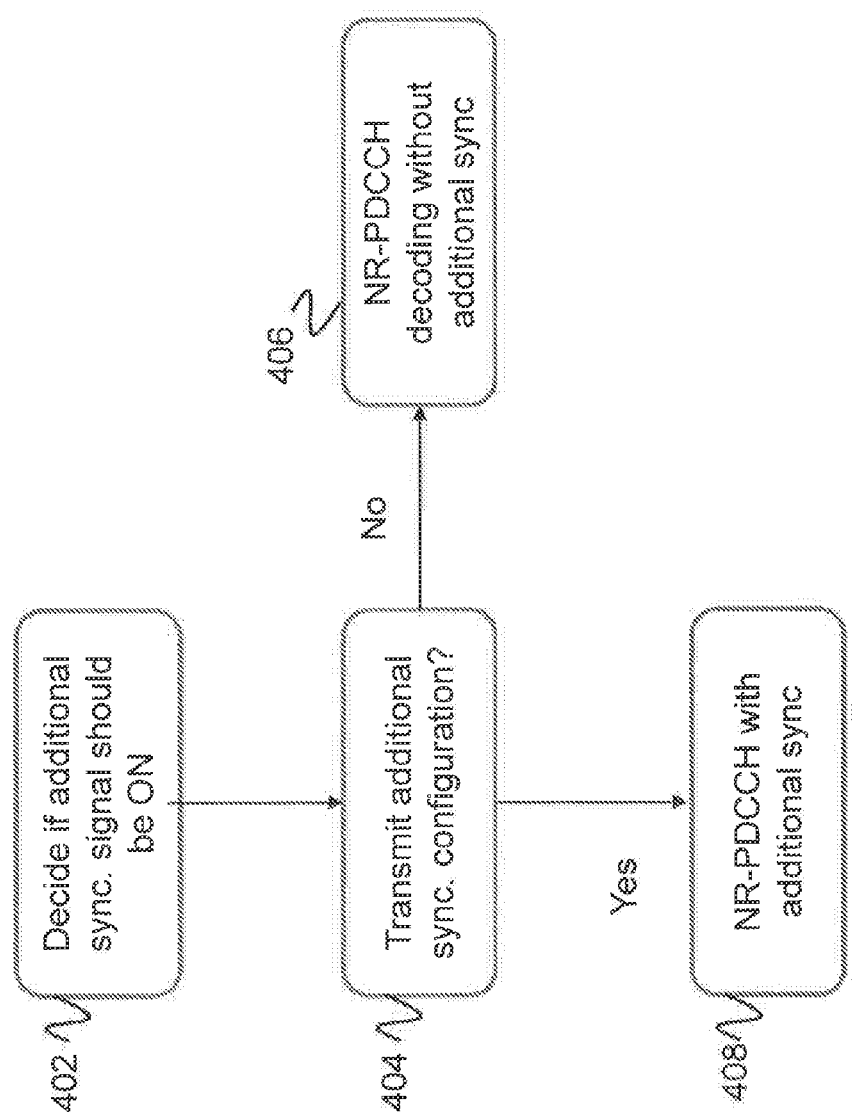
Figure 13:
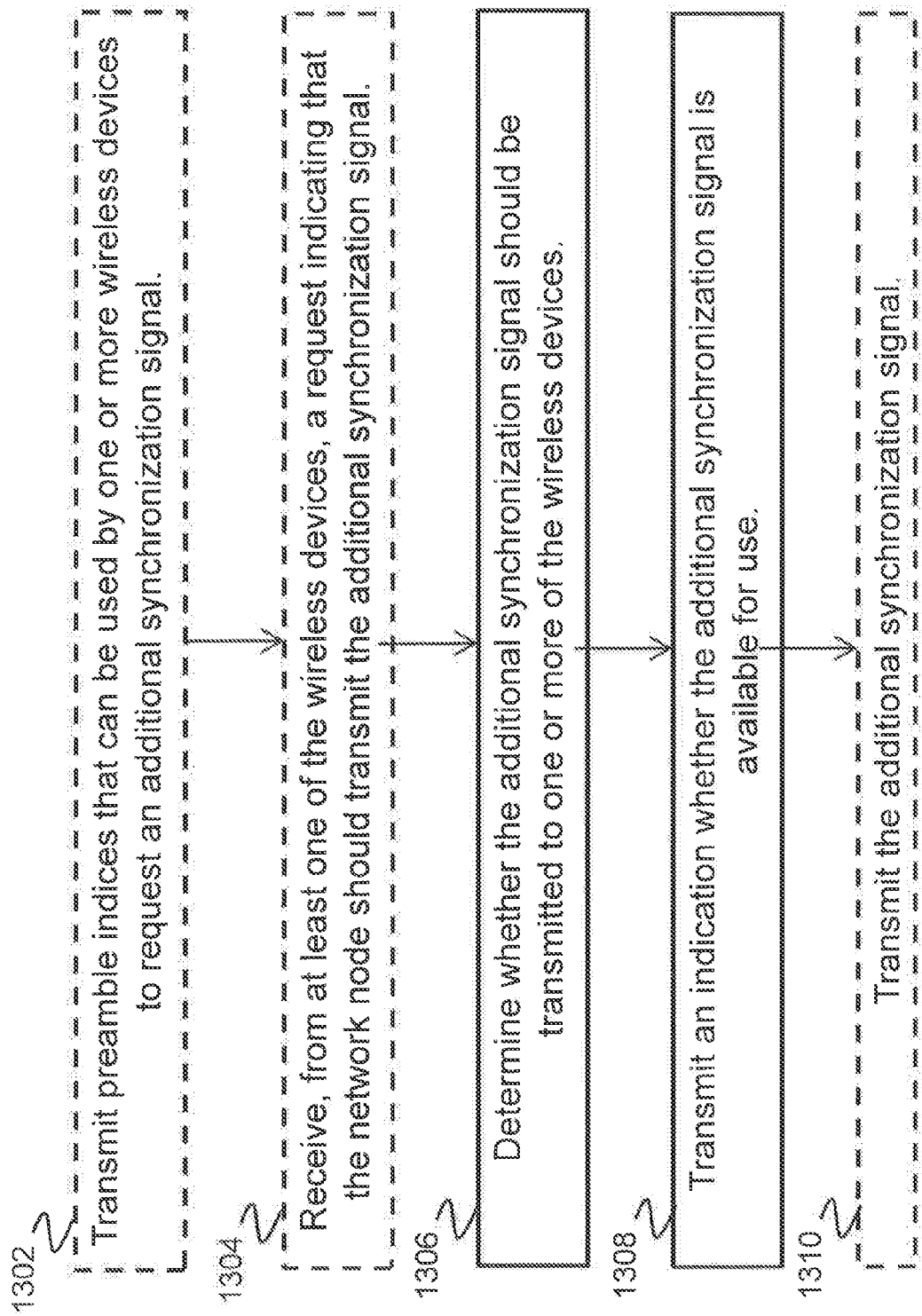
Figure 14:
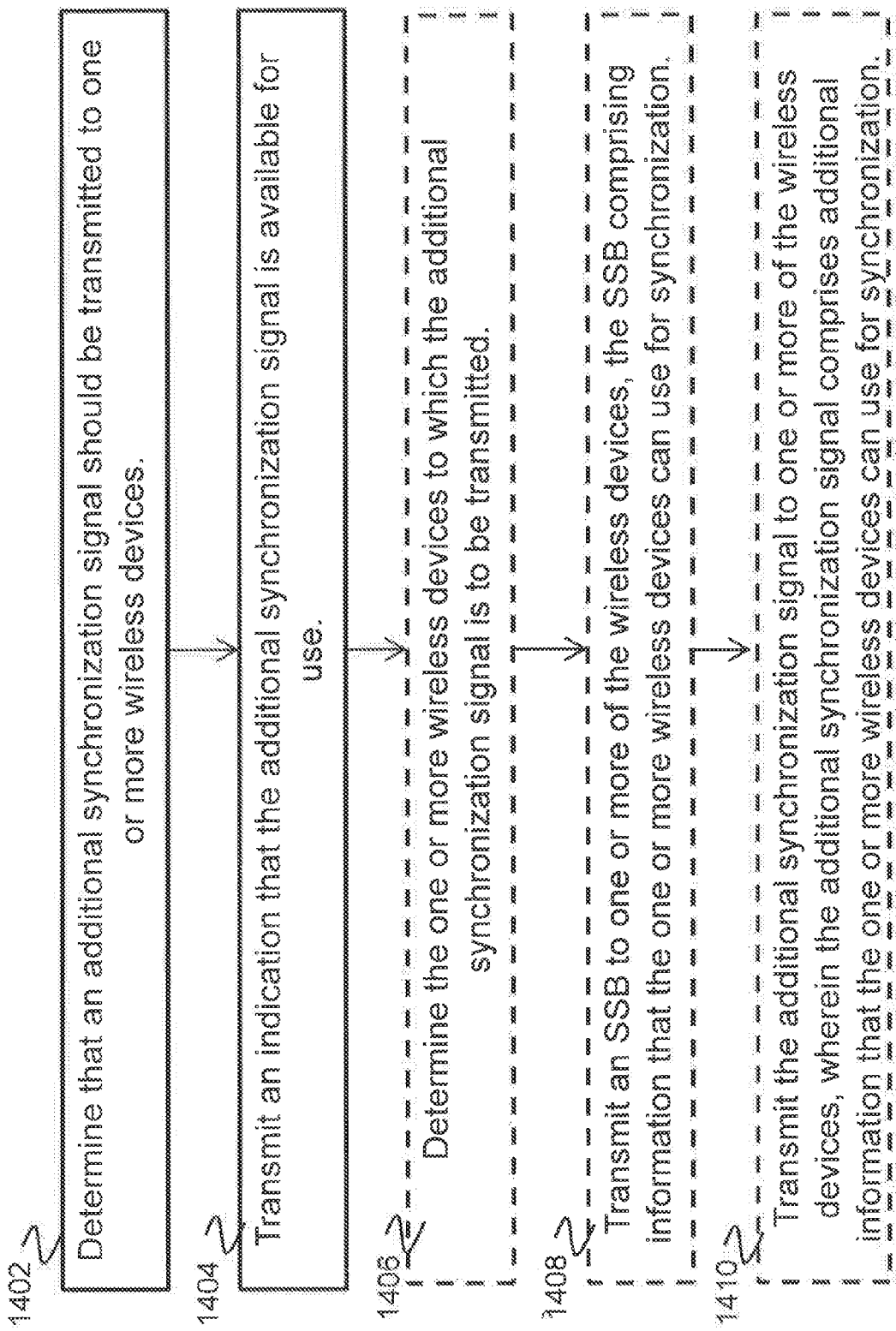

FIGS. 4A, 13, and 14 are flow diagrams illustrating examples of methods that may be performed by a network node, in accordance with certain embodiments.

Figure 4B:
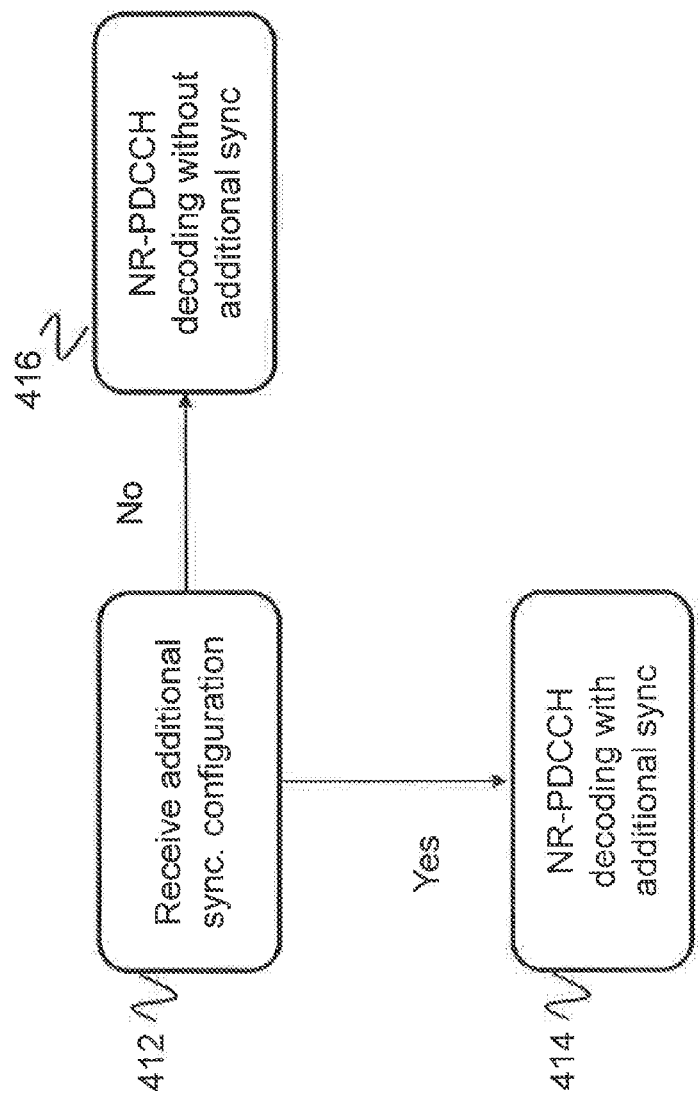
Figure 15A:
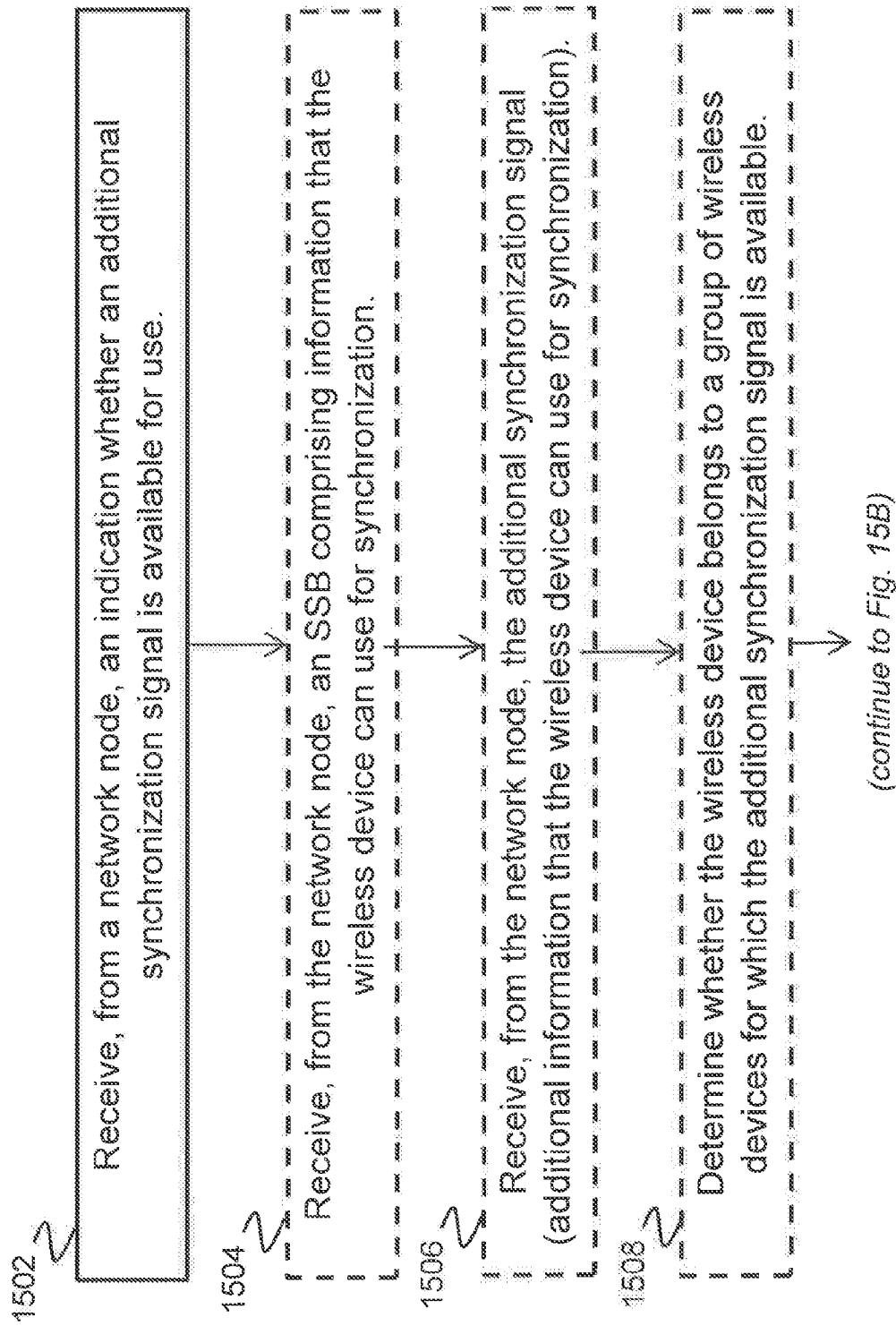
Figure 15B:
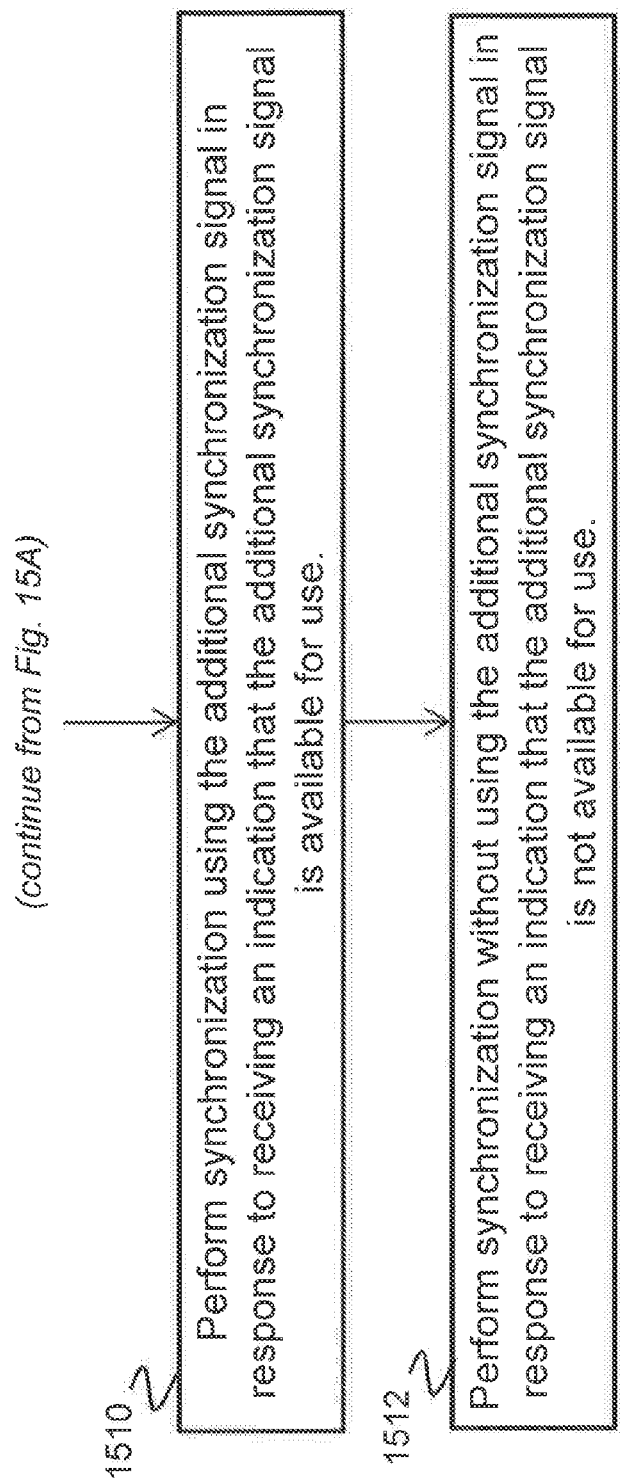
Figure 16:
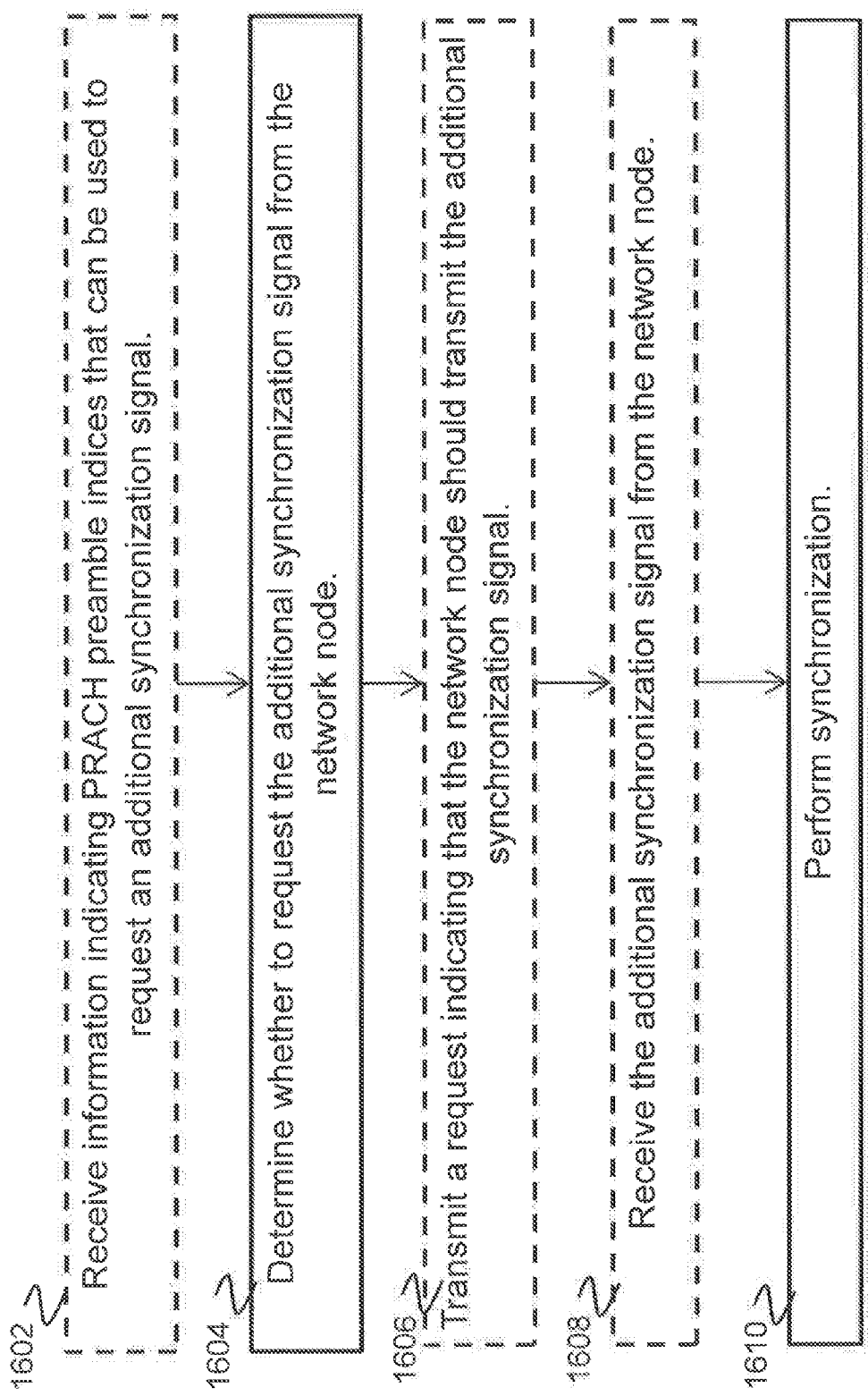

FIGS. 4B, 15, and 16 are flow diagrams illustrating examples of methods that may be performed by a wireless device, in accordance with certain embodiments.

Figure 5:
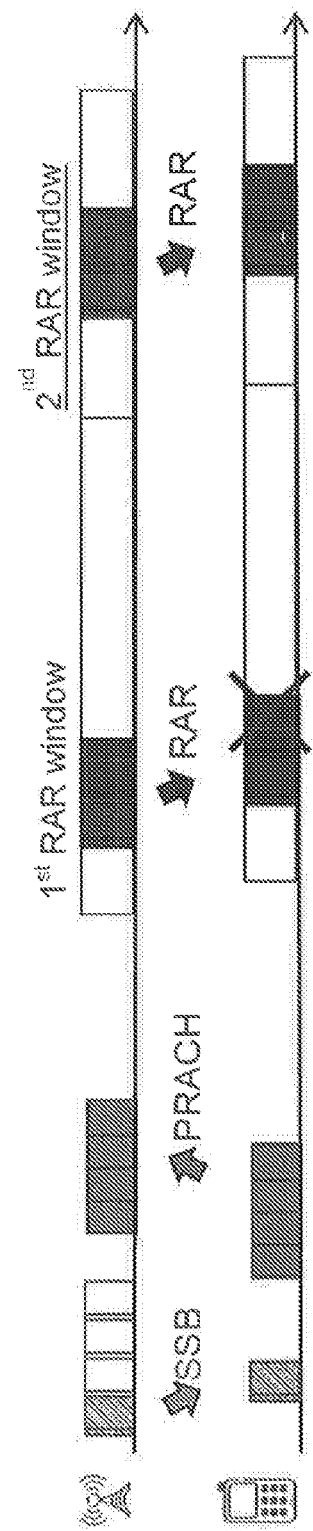

FIG. 5 illustrates an example embodiment of a first and second RAR window, according to aspects of the present disclosure.

Figure 6:
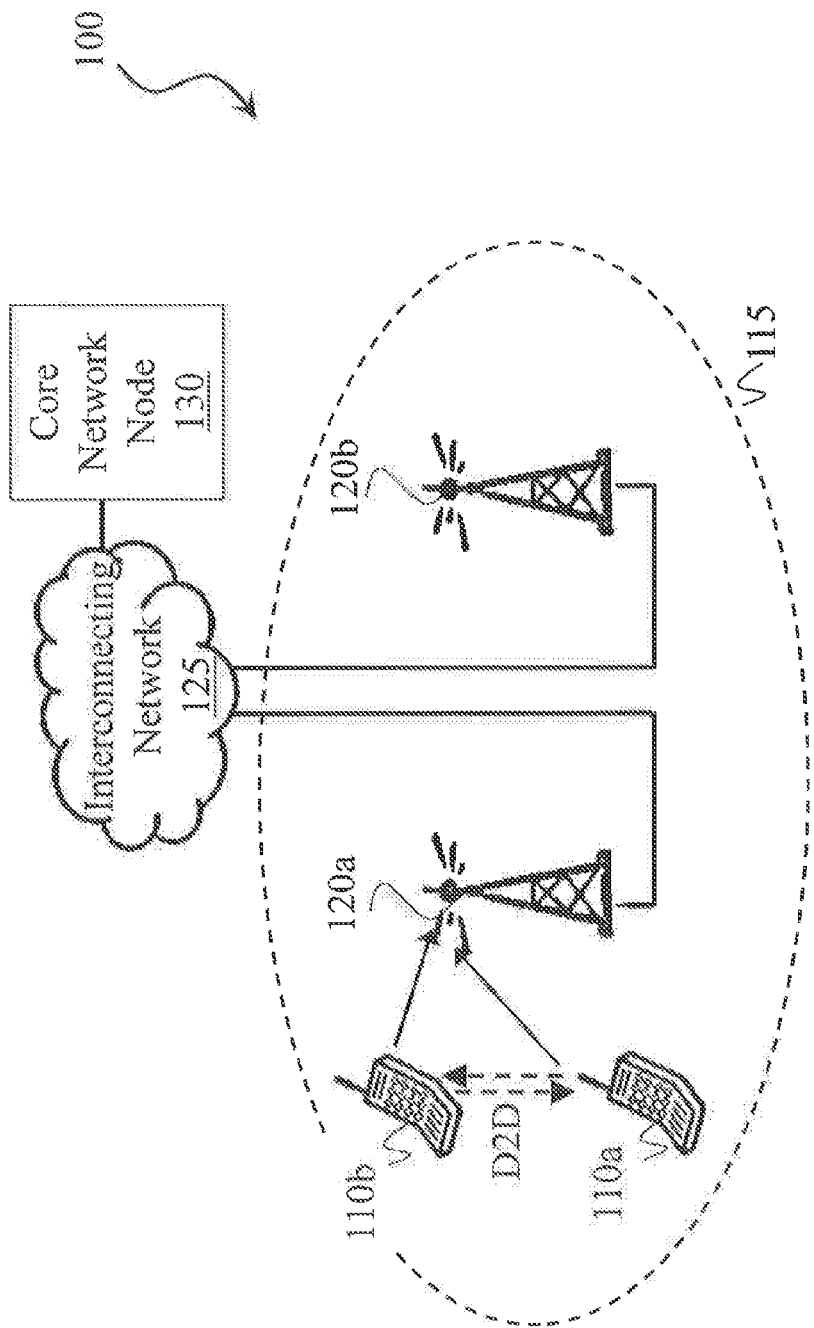

FIG. 6 illustrates an example of a wireless network that may be used to implement one or more of the embodiments described herein.

Figure 7:
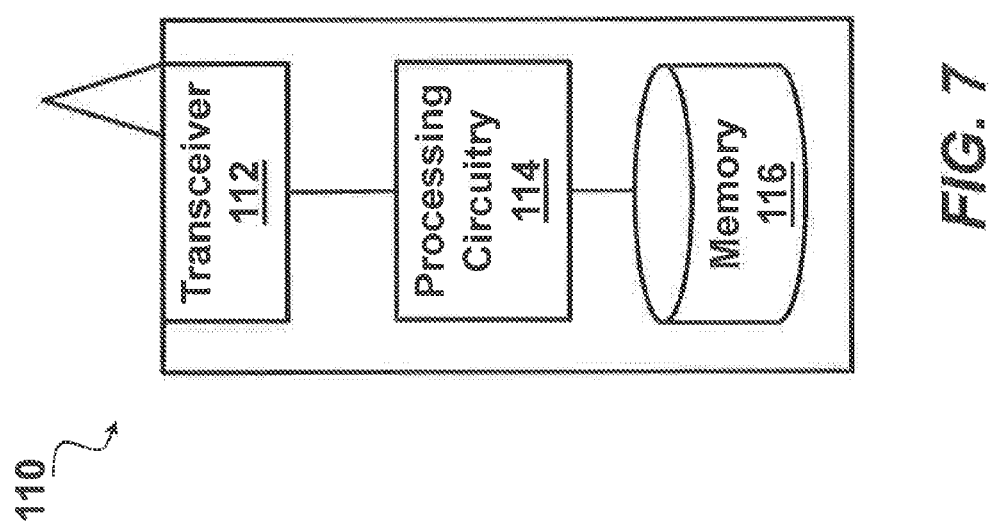

FIG. 7 is a block diagram of an exemplary wireless device, in accordance with certain embodiments.

Figure 8:
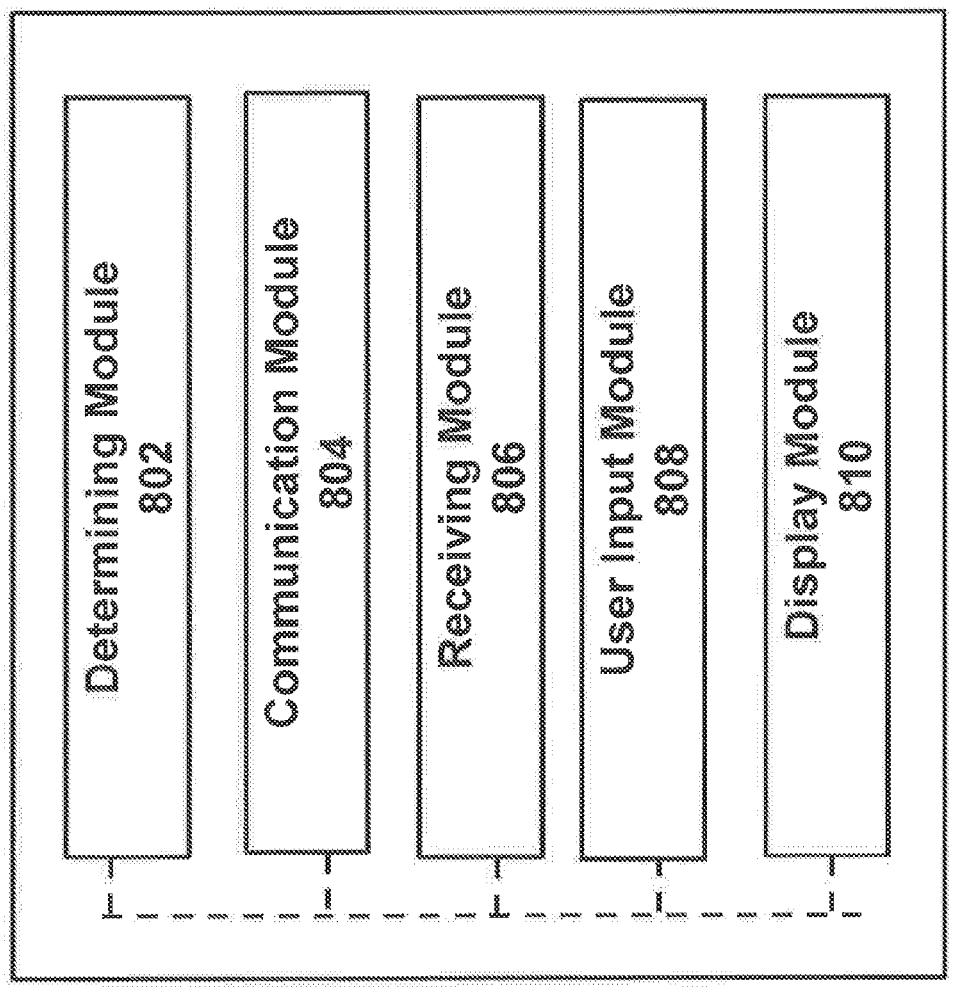

FIG. 8 illustrates examples of modules that can be included in a wireless device, in accordance with certain embodiments.

Figure 9:
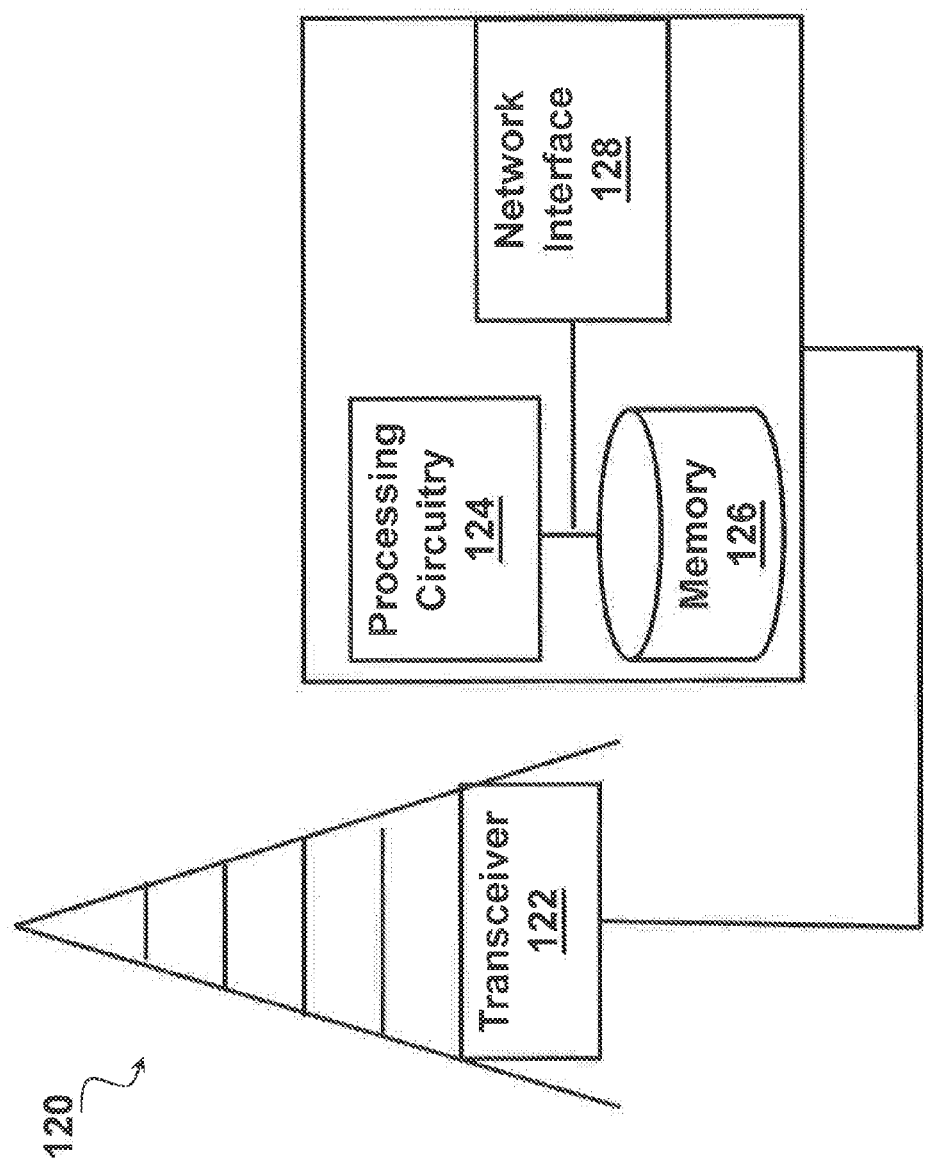

FIG. 9 is a block diagram of an exemplary network node, in accordance with certain embodiments.

Figure 10:
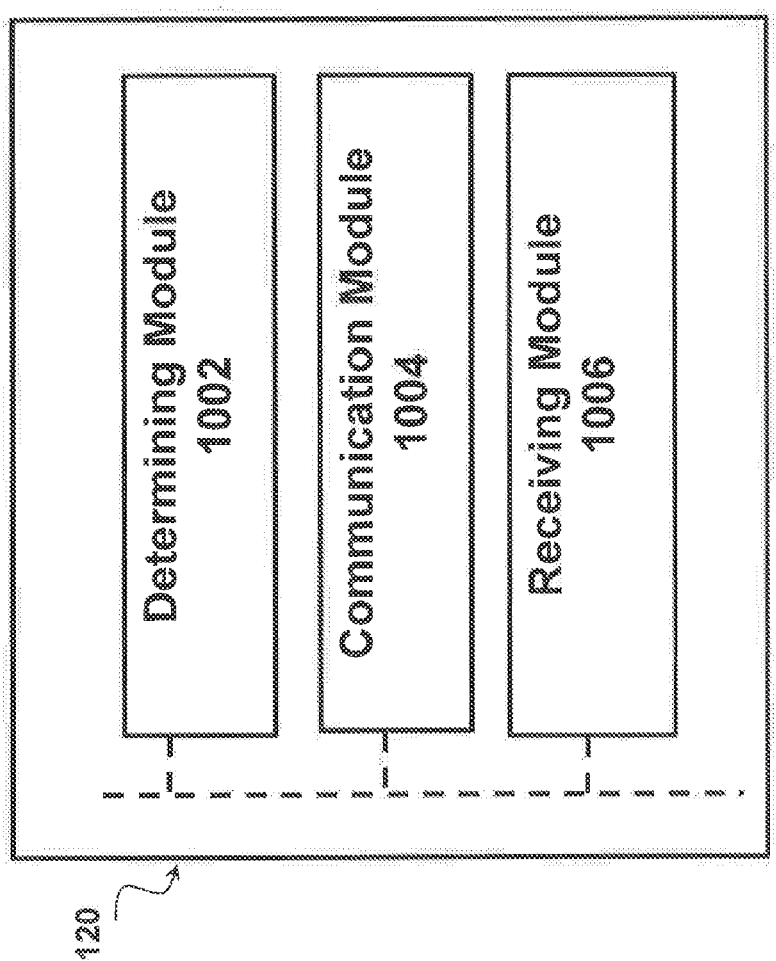

FIG. 10 illustrates examples of modules that can be included in a network node, in accordance with certain embodiments.

Figure 11:
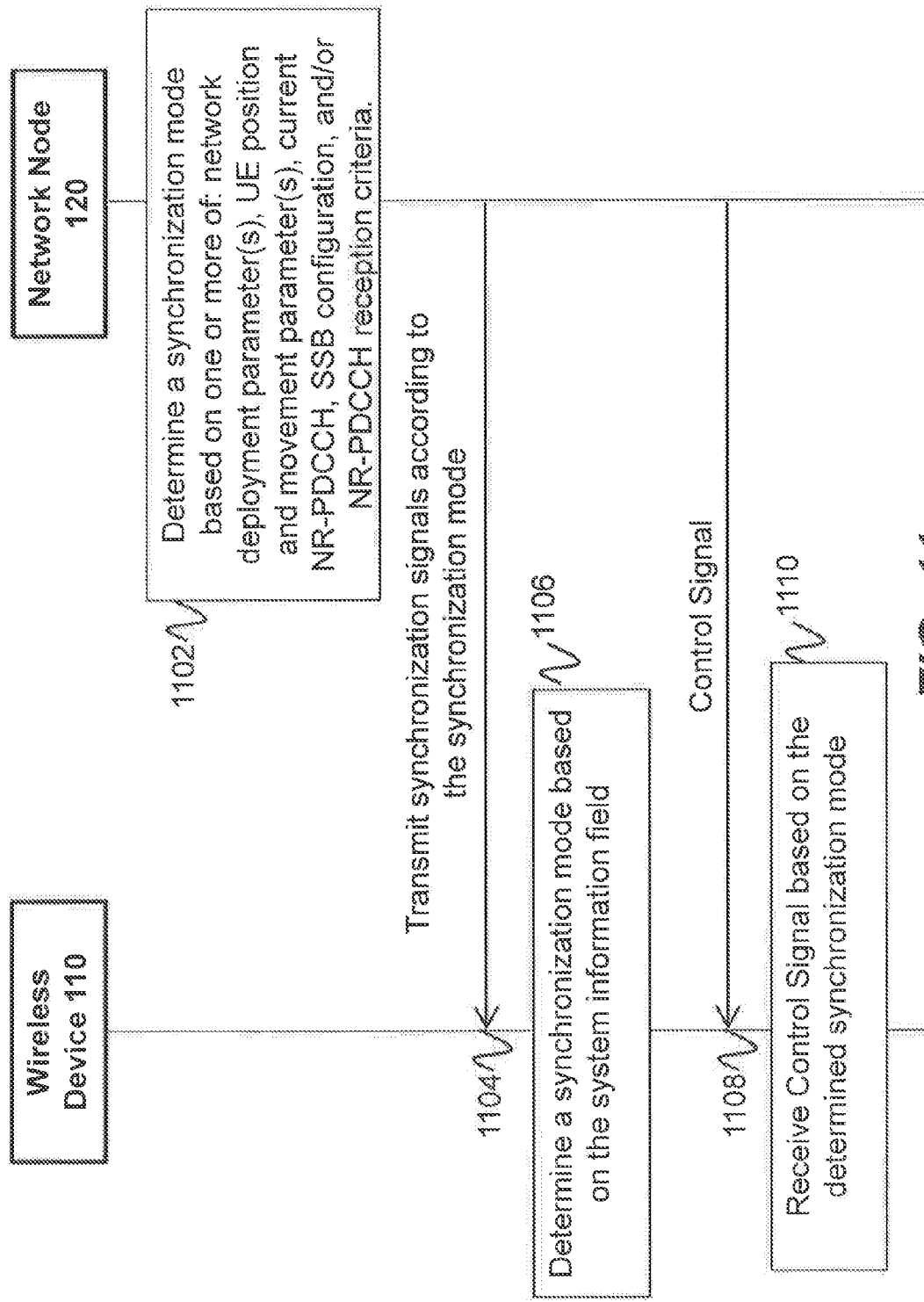
Figure 12:
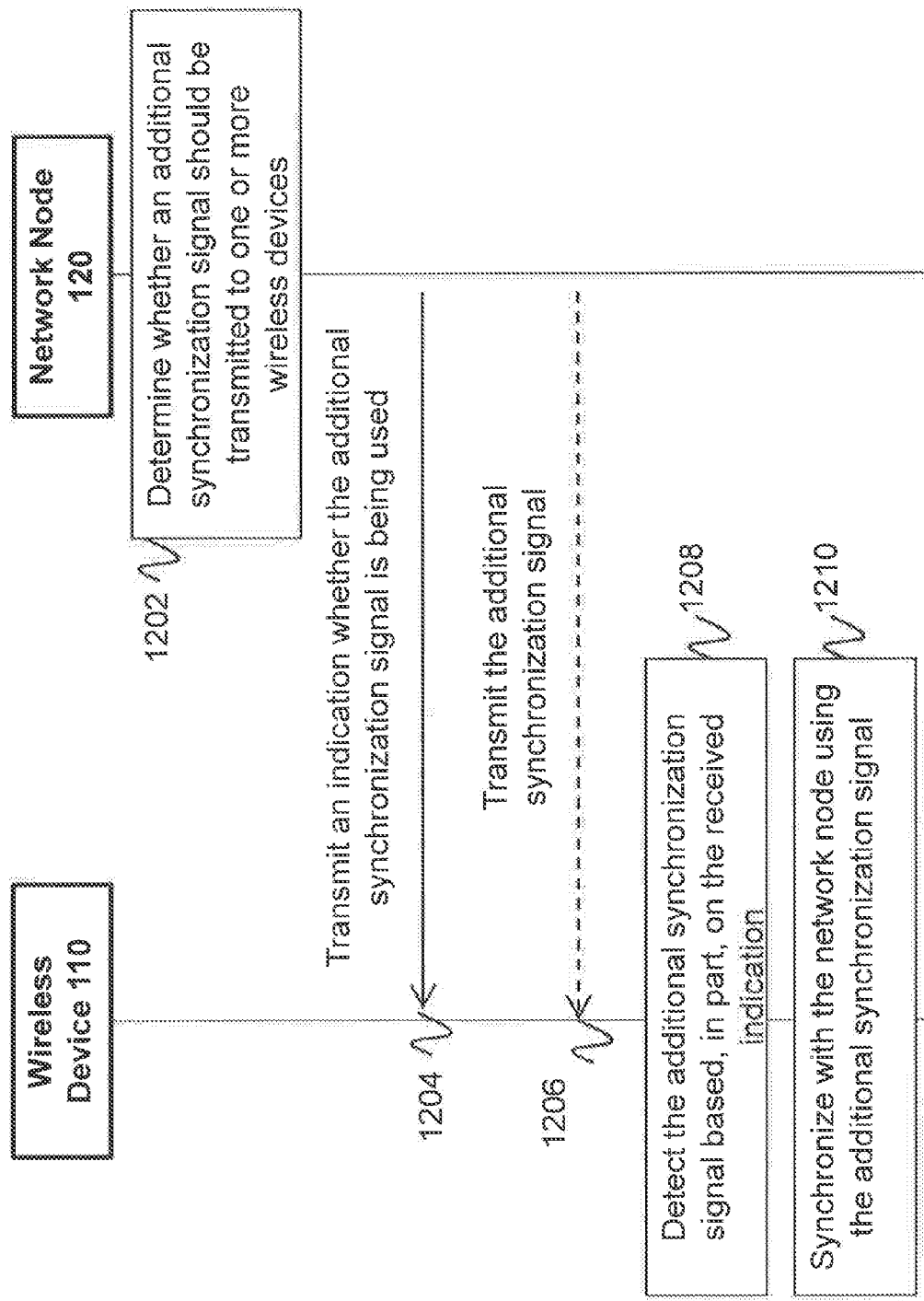

FIGS. 11-12 illustrate examples of signal flows between a wireless device and a network node, in accordance with certain embodiments.

FIGS. 13-14 illustrate examples of methods that may be performed by a network node, in accordance with certain embodiments.

FIGS. 15-16 illustrate examples of methods that may be performed by a wireless device, in accordance with certain embodiments.

DETAILED DESCRIPTION

FIG. 4A illustrates a flow chart that a gNB may follow when determining whether to transmit additional synchronization signaling, according to embodiments of the present disclosure. At step 402, the gNB may first decide whether additional synchronization signal should be switched on for a group of UEs. The group may refer to a single UE, a collection UEs sharing similar hardware or usage scenario properties, or all UEs in the system.

In step 404, the gNB transmits this synchronization configuration ON/OFF to the UE. If at step 404 the configuration of the indicator (e.g., a bit, a signal, a feature, a parameter) is OFF (No), then the method proceeds to step 406 where the NR-PDCCH will be demodulated and decoded without this additional synchronization signal and using only use synchronization based on SSB. If at step 404 the configuration of the indicator is ON (yes), then the method proceeds to step 408 where the NR-PDCCH will be demodulated and decoded with use this of additional synchronization signal. In some embodiments, the additional synchronization signal is used instead of SSB based synchronization. In other embodiments, the SSB may be used together with, or in addition to, the additional synchronization signal.

Several factors may determine whether to configure the indicator to ON or OFF. If the indicator is always ON, then time and/or frequency synchronization may be better than if synchronization is only based on SSB. But it is not always necessary to have it ON as SSB based synchronization is sufficient in many cases. It is also not always necessary to configure this additional indicator to ON mode for all silent nodes and SFN deployments. There may be some silent nodes, SFN, and doppler spread cases where time and/or frequency estimation provided by the SSB is sufficient. Thus, in certain embodiments, the gNB may determine whether additional synchronization signal(s) should be transmitted based on configuration information that indicates, for example, whether the node is a silent node or an SFN node (or participating in a SFN transmission). In certain embodiments, the gNB will decide when to configure additional synchronization to ON based on inputs from higher layers and possibly by measurements from the UE.

Several specific criteria for determining whether or not to configure the additional synchronization signal and how the UE can determine its presence are further elaborated below.

This additional synchronization provisioning may be achieved, for example, by configuring a signal with a structure similar to NR-PSS to be transmitted in close vicinity to other signals to be received by the UE, e.g., NR-PDCCH or CSI-RS. The additional synchronization signal may be transmitted using the same beamforming or precoding as the signal it is assisting, ensuring QCL properties. In certain embodiments, for example, in the paging support or beam measurement contexts, the additional synchronization signal does not need to be static since it will not be used for system access.

In order to avoid conflicts or confusion with NR-PSS within SSB, another M sequence (for example, another cyclic shift of the agreed polynomial for NR-PSS) may be chosen. Also, the frequency allocation of this additional synchronization signal can be changed as compared to an NR-PSS within SSB to result in a different time domain representation. The UE can use the NR-PSS receiver structure designed for SSB reception for detecting the additional synchronization as well. However, this is merely exemplary and other signal structures (in terms of transmitted sequences, time and frequency span, and time/frequency allocation) may also be used for the additional synchronization signal.

FIG. 4B illustrates a flow chart that a UE may follow, according to certain embodiments of the present disclosure. The UE receives the additional synchronization signal configuration in step 412. The additional synchronization signal configuration may include a bit configured as OFF or ON. If at step 412 the bit is configured to be OFF, then the method proceeds to step 414 where the NR-PDCCH demodulation and decoding is done without additional synchronization, such that only SSB based synchronization is used. If at step 412 the bit is configured to be ON, then the method proceeds to step 416 where the additional synchronization signal is used. The additional synchronization signal may be used instead of or in addition to the SSB-based synchronization.

Determining the Relevant Group of UEs

A common choice of synchronization signal configuration may not be optimal for all UEs. For example, the UEs in the system differ in terms of their mobility properties (from moving at high speed to semi-stationary), hardware limitations (e.g., some able to receive only narrow-band signals, others full-band signals without limitations), link budget (i.e., distance or amount of radio isolation material between UEs and gNB), energy limitations (some requiring minimal wake-up durations, others less sensitive to multiple signal reception instances for signal reception), or proximity to a silent node or other transmitting units forming a heterogenous network. Therefore, the configuration of the additional synchronization signal need not be performed uniformly for UEs in the system, but on a per-group basis. The group may refer to a single UE, a collection UEs sharing similar hardware or usage scenario properties, or all UEs in the system.

In case of paging, individual UEs can be configured to use the conventional or the additional synchronization signal, according to their usage scenario or constraints, e.g., the mobility, hardware constraints or energy efficiency targets.

In case of RAR, different types of UEs may be configured to use different synchronization signals. For example, massive machine type communication (MTC) UEs may be configured to use the conventional synchronization to avoid the additional search effort while possibly highly mobile UEs are to use the additional synchronization signal to optimize performance.

In one embodiment, the choice of additional synchronization configuration may be based on the specific SS block (SSB) that the UE has detected. The SS blocks index for which additional synchronization signals can be expected with RAR is indicated in broadcast (PBCH or RMSI). In one embodiment, the indication in PBCH is done per SSB, such that the indication of additional synchronization signals can be different depending on which SSB that the UE detects. When a UE has detected the SSB, and decoded broadcast, it will send a RACH preamble which is configured according to detected SSB and broadcast. When the gNB detects the RACH preamble from the UE, the gNB will know which SSB the UE detected and will send a RAR with additional synchronization if this SSB was configured for additional synchronization. The UE will expect a RAR with an additional synchronization signal if it transmitted a RACH preamble corresponding to an SSB that is configured for additional synchronization. The gNB determines the subset of SSBs that should be associated with additional synchronization in RAR. In one embodiment, the subset is determined based on previous measurements or connection history. For example, the gNB determines that many UEs in a direction corresponding to a subset of SSBs have very low signal-to-noise ratio (SNR) or signal to interference-plus-noise ratio (SINR). Alternatively, the UEs in a specific direction (corresponding to a subset of SSBs) are moving with a high speed. The subset can also be selected based on how well RAR transmissions have been received previously for each SSB. If many RARs are not followed by a message 3, then either the RAR was not received (not properly demodulated or decoded) in the UE or the message 3 was not received in gNB (not properly demodulated or decoded, e.g., transmitted with low power, large timing error, or large frequency offset). For those SSBs which the message 3 are not received, a new RAR might be transmitted before the end of the RAR window. Statistics can be stored in gNB based on number of failed message 3. The statistics can be used for configuring SSBs and corresponding additional synchronization signals.

Figure 1:
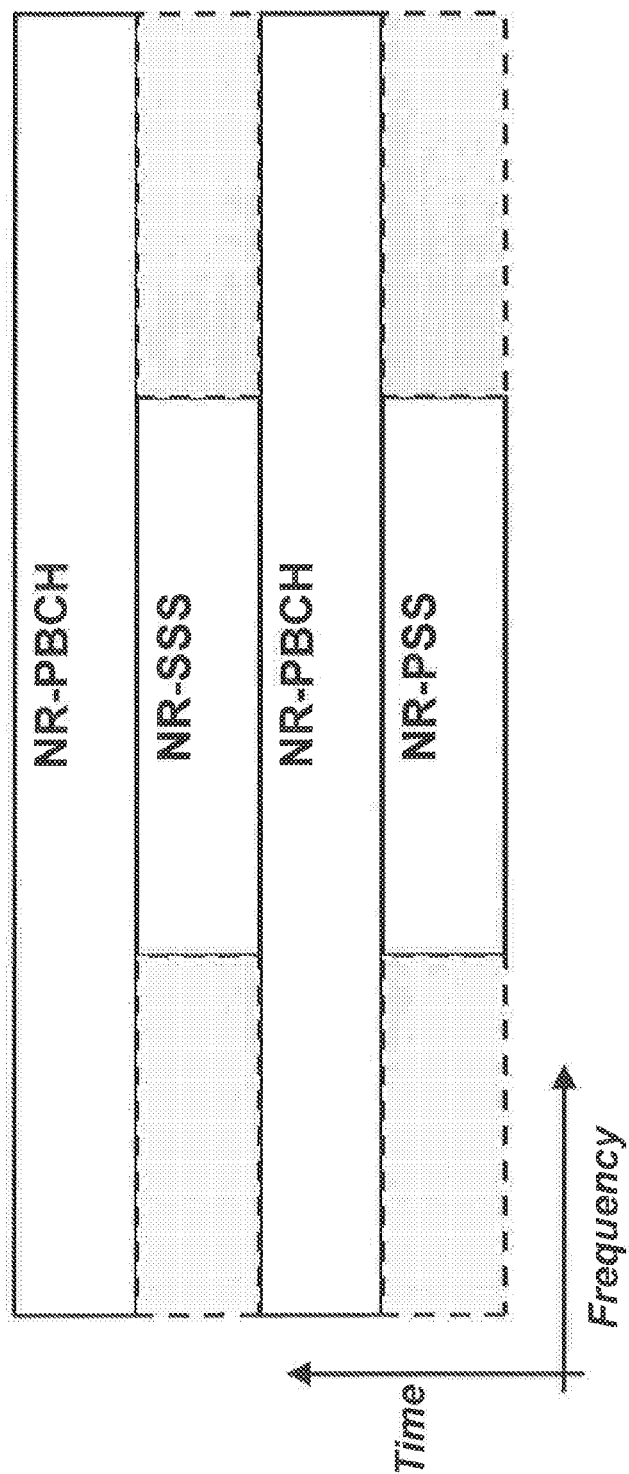
FIG. 1 illustrates a proposed structure of a synchronization signal block.
Figure 2:
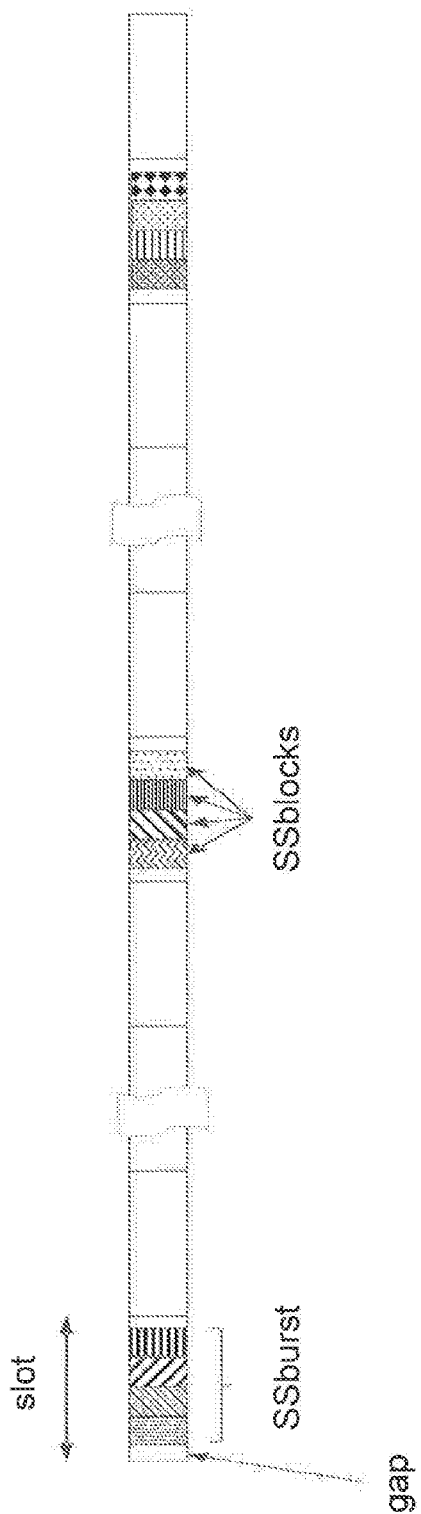
FIG. 2 illustrates an example of a synchronization signal burst.
Figure 3A:
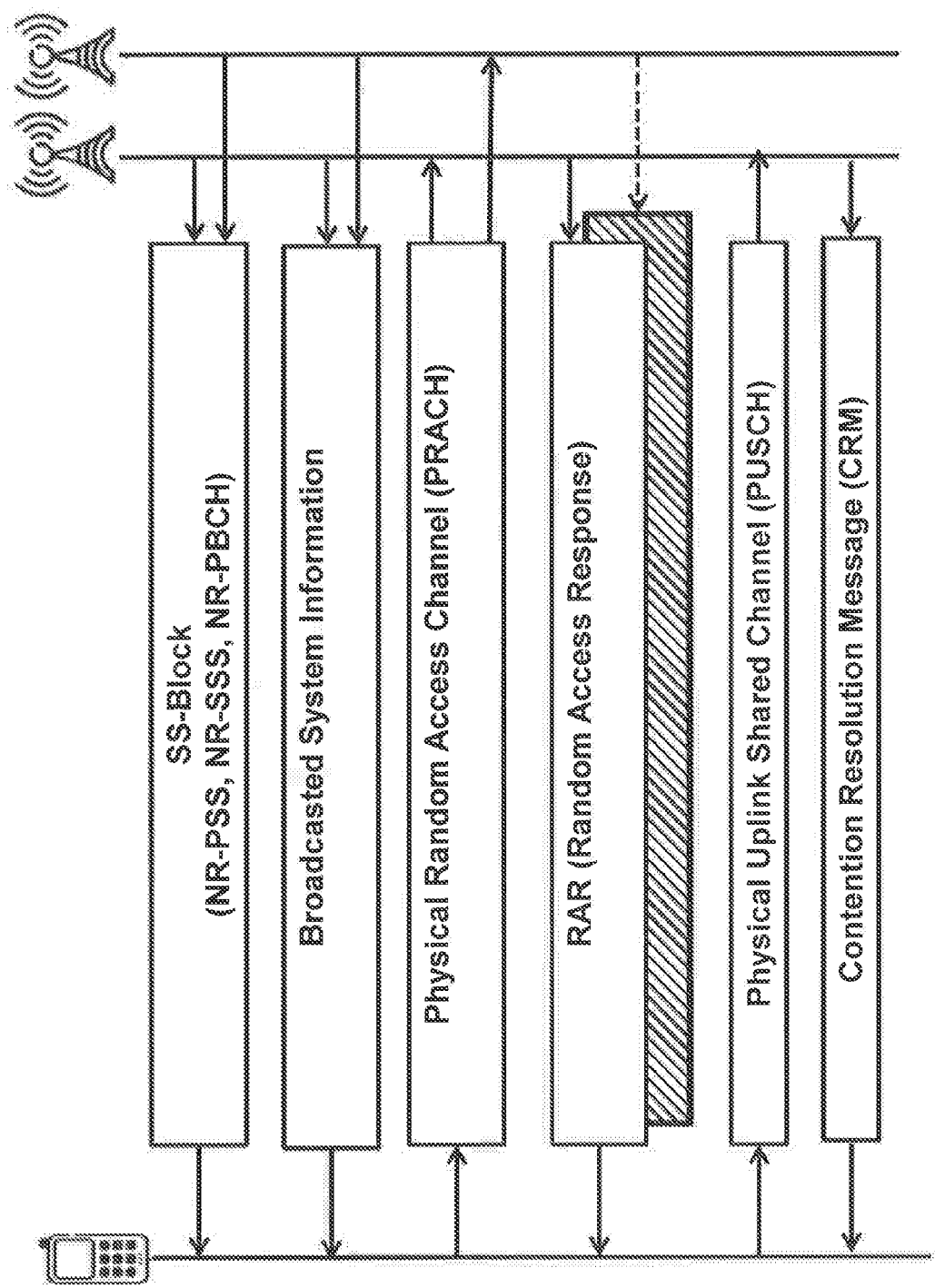
FIG. 3A illustrates an example of a random access procedure.
Figure 3B:
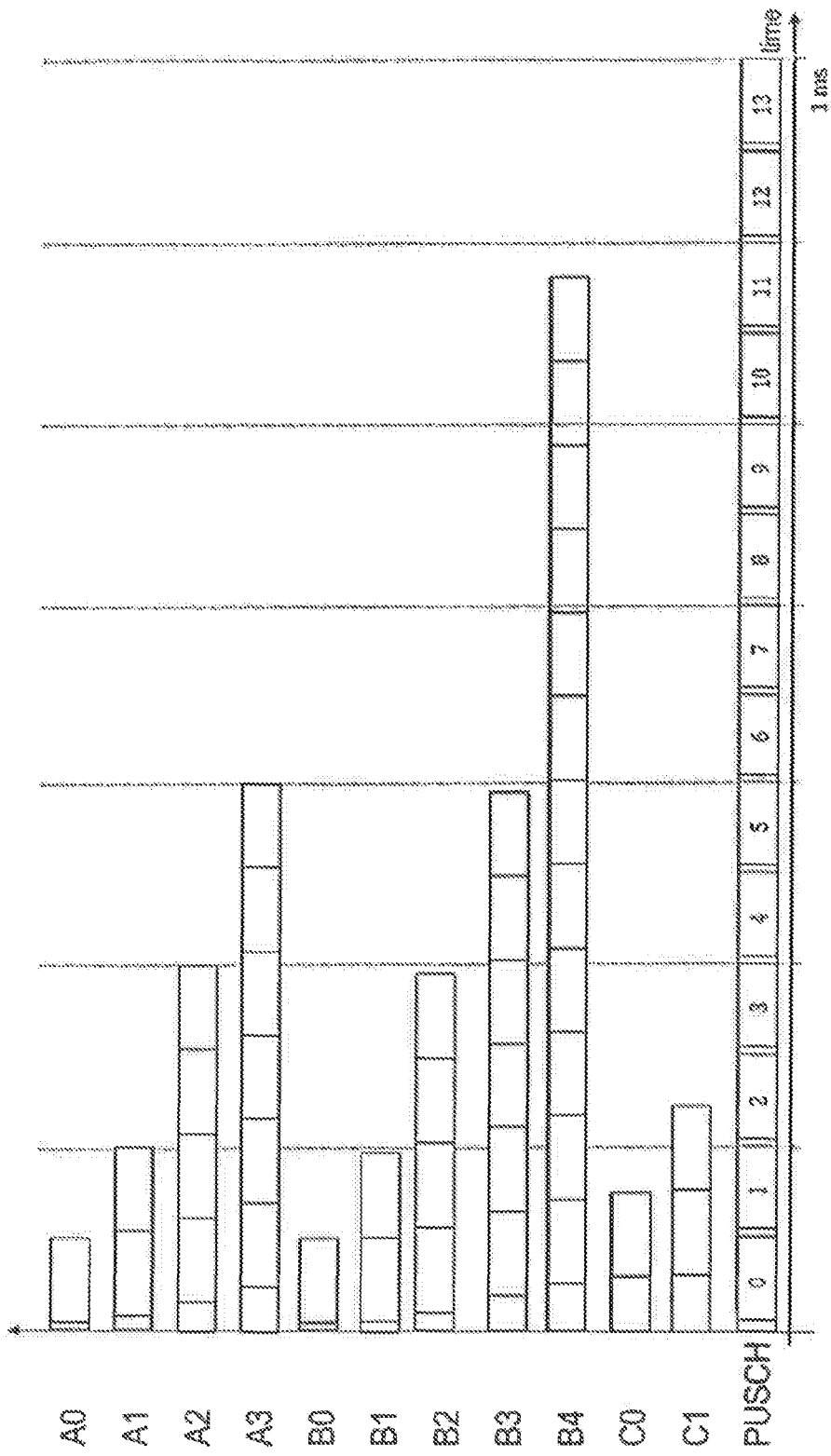
FIG. 3B illustrates an example of preamble formats for use in NR random access procedures.

In another embodiment, the system can define a subset of PRACH preamble indices which can be used by UE to "request" additional synchronization signals with RAR. Then the gNB sends an additional synchronization signal when sending RAR corresponding to such a preamble. The gNB transmits broadcast information which indicates RACH configurations. This configuration might contain the number of preambles in the current cell, e.g., 64 preambles. Of these, the configuration might also indicate a subset, e.g., 32, to be used by UEs that have decided that additional synchronization signals are useful. The UE decides whether to require additional synchronization signals, e.g., based on estimated UE speed (Doppler spread), frequency offset estimate, low SNR, low SINR, or estimation of timing or frequency offset variance. This timing or frequency offset variance is a measure of reliability of the timing and frequency offset estimates done by the UE. In another embodiment, the system sends additional synchronization signals in cells with certain RACH preamble configurations. For example, the system may use additional RAR synchronization signals when the cell is configured with preamble format B4 (quite many repetitions of the RACH OFDM symbol for coverage), as shown in FIG. 3B.

FIG. 5 illustrates an example embodiment of a first and second RAR window, according to aspects of the present disclosure. In the illustrated embodiment, a "second RAR window" may be defined—for example, after the normal RAR window—in which the UEs are expecting a RAR with additional synchronization signal, if it has not detected any RAR in the normal RAR window. The second RAR window is typically used by the gNB when a RAR in the first RAR window has failed. This failure can occur when the RAR was not received in the UE (i.e., the RAR was not properly demodulated or decoded by the UE). Additionally, this failure can occur when the message 3 was not received in gNB, for example, because the UE transmitted message 3 with low power, a large timing error, or a large frequency offset. For those SSBs for which the message 3 are not received, a new RAR might be transmitted before the end of the second RAR window. This second RAR window can be configured after the first RAR window. Typically, configuration of the second RAR window is broadcasted in RMSI. It is also possible to configure that no second RAR window is available. Additional RAR windows can be configured after the second RAR window with other configurations of RAR, e.g., yet more additional synchronization signals, other configurations of synchronization signals, and/or different amount of payload. These other configurations of synchronization signals can include higher density in time, higher density in frequency, or higher transmit power. Also, other configurations can be used in second or subsequent RAR windows, such as more robust channel coding (lower rate) and other channel coding schemes (block codes, convolutive codes, polar codes etc.).

In another embodiment, RAR contains PDCCH and PDSCH, but the UE might be able to decode PDCCH without additional synchronization since PDCCH is more robust than PDSCH. Indication(s) may then be provided in the DCI within PDCCH that a PDSCH is allocated with an additional RAR synchronization signal. Thus, the UE receives the indication(s) provided in the DCI transmitted in PDCCH and is able to detect an additional RAR synchronization signal to be used with the PDSCH.

Determining the presence of the additional synchronization signal

The chosen configuration may be signaled via RRC during paging and discontinuous reception (DRX) phase. Thus, the network node may transmit an indication that the additional synchronization signal is available for use during paging and DRX phase. In one embodiment, the signaling is a single bit transmitted in the NR-PBCH (master information block, MIB) field in the SSB or in the RMSI field. In another embodiment, the signaling may constitute multiple bits, so that not only the presence of the additional synchronization signal but also its type (e.g., the synchronization sequence used) may be signaled, or the different UE groups may be addressed separately. Having a single configuration bit in MIB is then a special case where a single group is defined that contains all UEs in the system. In one embodiment, the indication in PBCH is done per SSB, such that the indication of additional synchronization signals can be different depending on which SSB the UE detects. Thus, in this case, the MIB is different for different SSBs within a cell.

In one embodiment, the UE is assigned a "synchronization selection group ID" as part of e.g., paging configuration, and the UE would use that ID thereafter to extract relevant system information from the PBCH or RMSI in the cells that the UE moves through while in idle/inactive mode. For example, the PBCH or RMSI would contain synchronization configuration information for groups 1, 2, . . . etc. Alternatively, e.g., for PRACH reception configuration, the group ID may be derived by the UE autonomously based on its hardware or energy constraints category (or another UE category criterion).

In another embodiment, receiving an indication from a network node may be achieved by receiving a transmission of the NR-PDCCH in special control signaling search region, such that the UE can infer from that set of resources used for the NR NR-PDCCH, that this additional synchronization signal is configured. The additional synchronization signal is thus only transmitted when NR-PDCCH is mapped, transmitted or received in a predefined set of resources, and not if NR-PDCCH is mapped, transmitted, or received in other resources. In some embodiments, the "special" PDCCH resources can be defined as PDCCH REs and additional empty REs in the immediate vicinity. The UE can detect energy allocation in F-domain that suggests the presence of the special PDCCH and try to detect the additional synchronization signal, without having to decode it.

In some embodiments, receiving an indication from a network node may be achieved by receiving a transmission of a single bit transmitted in the NR-PBCH (MIB) field in the SSB or in the RMSI field. In some embodiments, the indication may constitute multiple bits so that the indication indicates not only the presence of the additional synchronization signal, but also its type (e.g., the synchronization sequence used). In this manner, the UE can infer from the one or more bits in the NR-PBCH (MIB) field in the SSB or in the RMSI field that an additional synchronization signal is configured.

In some embodiments, the synchronization sequence used may be a synchronization that shares its design with the SSB synchronization but deviates from the SSB synchronization's specific sequence and/or frequency allocation. For instance, in some embodiments, the PSS of the SSB synchronization may have a first m-sequence. The additional synchronization sequence may be a second m-sequence of the same length as the first m-sequence but may be generated from a different generator state.

Determining when to activate additional synchronization signal In a non-limiting illustrative embodiment of how a network node can determine whether an additional synchronization signal is required, a NR network node deployment with 15 kHz numerology at 4 GHz is discussed. The frequency accuracy obtained from SSB detection may be 2% of the SCS (0.3 kHz) and the timing accuracy in near-perfect, while the permissible timing inaccuracy for reliable NR-PDCCH reception is 80% of the CP length (3.9 us) and 5% of the SCS (0.75 kHz). Then the network can consider for example, the following specific deployment options and scenarios and determine the need for additional synchronization signals:

SFN transmission of SSB: In some deployments, an NR cell will consist of multiple TRPs. In order to improve the link budget, the TRPs may transmit the same SSB information (in a single SS block) from all TRPs in an SFN manner. A UE therefore obtains an initial timing reference associated with a highly dispersive SFN channel. However, the NR-PDCCH will be transmitted by a single TRP in the cell, preferably the closest to the UE based on UL evaluation by the gNB. Depending on the instantaneous fading realization, this may lead to a timing mismatch for NR-PDCCH reception. The same problem may occur if SSB is transmitted from individual nodes but the NR-PDCCH in an SFN manner, as may be the case for RMSI distribution. In a deployment with gNBs placed at an inter site distance (ISD) of "A"

km, the 90%-energy power delay profile window extends to 9*A μs. Depending on instantaneous fading, a distant SFN node may cause a peak in the power delay profile (PDP) and the effective NR-PDCCH timing offset may exceed the permissible timing inaccuracy of the NR-PDCCH and critically impair its detection performance. The network can thus determine that an additional synchronization signal is necessary if the ISD exceeds a critical value in relation to the cyclic prefix (CP) length (in the example, if A>0.4 km).

Another possible deployment type is the silent node deployment where the received SSB does not necessarily reflect the relevant time and frequency alignment parameters for the RAR NR-PDCCH. Some of the nodes, for example the macro gNB layer, transmit the SSB, while others, e.g., the pico gNB layer, do not. However, the network may choose to respond with a RAR from one of the silent nodes for which the time and frequency parameters of the detected SSB node are suboptimal or outright unsuitable. For example, the "B" km ISD macro deployment case above may cause timing errors up to 3.3*B us to the closest pico node, significantly degrading NR-PDCCH reception. The network can thus determine that an additional synchronization signal is necessary if the ISD in a silent node deployment exceeds a critical value in relation to the CP length (in the example, if B>1.2 km)

Additionally, the Doppler difference with respect to the RAR-transmitting TRP and the dominant TRP in the SFN profile may exceed a critical fraction of the SCS and also degrade NR-PDCCH reception. For example, a UE moving at "C" km/h in 4 GHz carrier can incur a Doppler-related frequency error of up to 0.0075*C kHz, yielding, e.g., 1.2 kHz total error including the residual error after SSB detection for C=120 km/h. The network can thus determine that an additional synchronization signal is necessary if the expected UE speed in an SFN_SSB or silent node deployment exceeds a critical value in relation to the SCS (in the example, if C>60 km/h) to avoid operating beyond the planned reception range of NR-PDCCH. The gNB might measure Doppler spread of UEs in the cell and decide upon configuration of additional synchronizations for control channels based on the outcome of these measurements. If the cell contains a large fraction of high speed UEs, then the use of additional synchronizations for control channels is justified. In non-standalone deployments, the SSB period may be configured to be long, e.g., 80-160 ms, to maximize network energy efficiency. In paging configurations where the paging occasion is temporally separated from the closest previous SSB occasion, a long delay between SSB and detection and NR-PDCCH reception may cause the UE local frequency reference, operating in an open-loop mode, to drift by a non-negligible fraction of the SCS. Assuming a typical frequency drift rate of 2 ppm/s when a UE transitions from active to inactive mode, the frequency drift after "D" ms is up to 0.008*D kHz (yielding 1.5 kHz total error including initial residual SSB detection error for a 150 ms gap). This again deteriorates PDCCH reception quality or may make reception impossible. The network can thus determine that an additional synchronization signal is necessary if the SSB-to-PDCCH gap may exceed a critical value (in the example, if D>56 ms).

FIG. 6 illustrates an example of a wireless network 100 that may be used for wireless communications and to implement one or more of the embodiments discussed with reference to FIGS. 1-5, 11-16, and/or the example embodiments described below. Wireless network 100 includes a plurality of radio nodes. Examples of radio nodes include wireless devices 110a-10b (such as a UE) and radio access nodes 120a-120b (such as a gNB, eNB, or base station). The radio access nodes 120 connect to one or more core network nodes 130 via an interconnecting network 125. Wireless devices 110 within coverage area 115 may each be capable of communicating directly with radio access nodes 120 over a wireless interface. Wireless devices may also be capable of communicating with each other via device-to-device (D2D) communication.

As an example, wireless device 110a may communicate with radio access node 120a over a wireless interface. That is, wireless device 110a may transmit wireless signals and/or receive wireless signals from radio access node 120a. The wireless signals may contain voice traffic, data traffic, control signals, and/or any other suitable information. In some embodiments, an area of wireless signal coverage associated with a radio access node 120 may be referred to as a cell.

In some embodiments wireless device 110 may be interchangeably referred to by the non-limiting term user equipment (UE). Wireless device 110 refers to any type of wireless device communicating with a network node and/or with another UE in a cellular or mobile communication system. Examples of a UE include a target device, device to device (D2D) UE, vehicle-to-anything (V2x) UE, machine type UE or UE capable of machine to machine (M2M) communication, personal digital assistant (PDA), PAD, Tablet, mobile terminals, smart phone, laptop embedded equipped (LEE), laptop mounted equipment (LME), USB dongles, etc. Thus, although FIG. 6 illustrates wireless devices 110 as phones, other embodiments may use other types of wireless devices 110 (including, e.g., NB-IoT UEs, such as Cat N1 and Cat N2 UEs, and/or LTE coverage enhanced UEs, such as Cat M1 and Cat M2 UEs). Example embodiments of wireless device 110 are described in more detail below with respect to FIGS. 7-8.

In some embodiments radio access node 120 may be interchangeably referred to by the non-limiting terms gNB, eNB, base station, network node, or WAN node. The WAN node can be a UE (e.g., D2D UE) or a network node (e.g., access point, base station, cellular node, etc.). Example embodiments of radio access node 120 are described in more detail below with respect to FIGS. 9-10.

In certain embodiments, radio access nodes 120 may interface with a radio network controller. The radio network controller may control radio access nodes 120 and may provide certain radio resource management functions, mobility management functions, and/or other suitable functions. In certain embodiments, the functions of the radio network controller may be included in radio access node 120. The radio network controller may interface with a core network node 130. In certain embodiments, the radio network controller may interface with the core network node 130 via an interconnecting network 125.

The interconnecting network 125 may refer to any interconnecting system capable of transmitting audio, video, signals, data, messages, or any combination of the preceding. The interconnecting network 125 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node 130 may manage the establishment of communication sessions and various other functionalities for wireless devices 110. Wireless devices 110 may exchange certain signals with the core network node using the non-access stratum layer. In non-access stratum signaling, signals between wireless devices 110 and the core network node 130 may be transparently passed through the radio access network. In certain embodiments, radio access nodes 120 may interface with one or more network nodes over an internode interface. For example, radio access nodes 120a and 120b may interface over an X2 interface.

Although FIG. 6 illustrates a particular arrangement of network 100, the present disclosure contemplates that the various embodiments described herein may be applied to a variety of networks having any suitable configuration. For example, network 100 may include any suitable number of wireless devices 110 and radio access nodes 120, as well as any additional elements suitable to support communication between wireless devices or between a wireless device and another communication device (such as a landline telephone). The embodiments may be implemented in any appropriate type of telecommunication system supporting any suitable communication standards and using any suitable components, and are applicable to any radio access technology (RAT) or multi-RAT systems in which the wireless device receives and/or transmits signals (e.g., data). While the embodiments are described for LTE, the embodiments are applicable to any RAT, such as 5G, NR, LTE FDD/TDD, WCDMA/HSPA, GSM/GERAN, Wi Fi, WLAN, CDMA2000, etc., including adaptations of these RATs for operation under any regulatory domain, licensed or unlicensed.

FIG. 7 is a block diagram of an exemplary wireless device 110, in accordance with certain embodiments. Wireless device 110 includes a transceiver 112, processing circuitry 114 (e.g., comprising one or more processors), and memory 116. In some embodiments, transceiver 112 facilitates transmitting wireless signals to and receiving wireless signals from network node/WAN node/radio access node 120 (e.g., via an antenna), processing circuitry 114 executes instructions to provide some or all of the functionality described herein as being provided by a wireless device (or UE), and memory 116 stores the instructions executed by processing circuitry 114. Processing circuitry 114 may include any suitable combination of hardware and software implemented in one or more modules to execute instructions and manipulate data to perform some or all of the described functions of wireless device 110, such as the function of determining a synchronization mode based on the system information field, including any of the functionality described herein as being performed by a wireless device/UE (for example, the wireless device functionality described with respect to FIGS. 1-6, 8, 11-12, 15-16 and/or the example embodiments described below). In some embodiments, processing circuitry 114 may include, for example, one or more computers, one or more central processing units (CPUs), one or more microprocessors, one or more applications, one or more application specific integrated circuits (ASICs), one or more field programmable gate arrays (FPGAs) and/or other logic. In certain embodiments, the processing circuitry 114 may comprise one or more of the modules discussed with respect to FIG. 8.

Memory 116 is generally operable to store instructions, such as a computer program, software, an application including one or more of logic, rules, algorithms, code, tables, etc. and/or other instructions capable of being executed by a processor. Examples of memory 116 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processing circuitry 114 of wireless device 110.

Other embodiments of wireless device 110 may include additional components beyond those shown in FIG. 7 that may be responsible for providing certain aspects of the wireless device's functionality, including any of the functionality described herein and/or any additional functionality (including any functionality necessary to support the solution described herein). As just one example, wireless device 110 may include input devices and circuits, output devices, and one or more synchronization units or circuits, which may be part of the processing circuitry 114. Input devices include mechanisms for entry of data into wireless device 110. For example, input devices may include input mechanisms, such as a microphone, input elements, a display, etc. Output devices may include mechanisms for outputting data in audio, video and/or hard copy format. For example, output devices may include a speaker, a display, etc.

FIG. 8 illustrates examples of modules that can be included in wireless device 110. In certain embodiments, wireless device 110 may include any one or more of determining module(s) 802, communication module(s) 804, receiving module(s) 806, user input module(s) 808, display module(s) 810, and/or other suitable modules. The functionality of the modules may be integrated in a single component or separated among several components in any suitable manner. In certain embodiments, one or more of the modules may be implemented using processing circuitry 114 described with respect to FIG. 7.

The determining module 802 may perform the processing functions of wireless device 110 (including any of the UE functionality to support the above-described embodiments). As one example, the determining module 802 may determine a synchronization mode based on the system information field using the techniques described with respect to FIGS. 1-5, 11-12, 15-16, and/or the example embodiments described below.

The determining module 802 may include or be included in one or more processors, such as processing circuitry 114 described above in relation to FIG. 7. The determining module 802 may include analog and/or digital circuitry configured to perform any of the functions of the determining module 802 and/or processing circuitry 114 described above. The functions of the determining module 802 described above may, in certain embodiments, be performed in one or more distinct modules.

The communication module 804 may perform the transmission functions of wireless device 110. The communication module 804 may include a transmitter and/or a transceiver, such as transceiver 112 described above in relation to FIG. 7. The communication module 804 may include circuitry configured to wirelessly transmit messages and/or signals. In particular embodiments, the communication module 804 may receive messages and/or signals for transmission from the determining module 802. In certain embodiments, the functions of the communication module 804 described above may be performed in one or more distinct modules.

The receiving module 806 may perform the receiving functions of wireless device 110. For example, the receiving module 806 may receive information from a network node. The receiving module 806 may receive a system information field from a network node and/or receive a control signal based on a synchronization mode from a network node. The receiving module 806 may include a receiver and/or a transceiver, such as transceiver 112 described above in relation to FIG. 7. The receiving module 806 may include circuitry configured to wirelessly receive messages and/or signals. In certain embodiments, the receiving module 806 may include circuitry configured to receive information from memory 116 of wireless device 110. In particular embodiments, the receiving module 806 may communicate received messages and/or signals to the determining module 802. The functions of the receiving module 806 described above may, in certain embodiments, be performed in one or more distinct modules.

In certain embodiments, wireless device 110 may optionally include a user input module 808 that may receive user input intended for wireless device 110. For example, the user input module 808 may receive key presses, button presses, touches, swipes, audio signals, video signals, and/or any other appropriate signals. The user input module 808 may include one or more keys, buttons, levers, switches, touchscreens, microphones, and/or cameras. The user input module 808 may communicate received signals to the determining module 802. The functions of the user input module 808 described above may, in certain embodiments, be performed in one or more distinct modules.

In certain embodiments, wireless device 110 may optionally include a display module 810, which may present signals on a display of wireless device 110. The display module 810 may include the display and/or any appropriate circuitry and hardware configured to present signals on the display. The display module 810 may receive signals to present on the display from the determining module 802. The functions of the display module 810 described above may, in certain embodiments, be performed in one or more distinct modules.

Each module depicted in FIG. 8 may include any suitable configuration of hardware and/or software. Wireless device 110 may include additional modules beyond those shown in FIG. 8 that may be responsible for providing any suitable functionality, including any of the functionality described above and/or any additional functionality (including any functionality necessary to support the various solutions described herein).

In certain embodiments, some or all of the modules shown in FIG. 8 can be combined with one or more modules shown in FIG. 7. As an example, certain embodiments may combine at least some of the functionality of the processing circuitry 114 (FIG. 7) with the determining module 802 (FIG. 8). As another example, certain embodiments may combine at least some of the functionality of the transceiver 112 (FIG. 7) with the communication module 804 and/or receiving module 806 (FIG. 8).

FIG. 9 is a block diagram of an exemplary network node, such as radio access node 120, in accordance with certain embodiments. Radio access node 120 may include one or more of a transceiver 122, processing circuitry 124 (e.g., comprising one or more processors), memory 126, and network interface 128. In some embodiments, transceiver 122 facilitates transmitting wireless signals to and receiving wireless signals from wireless device 110 (e.g., via an antenna), processing circuitry 124 executes instructions to provide some or all of the functionality described herein as being provided by a radio access node 120, memory 126 stores the instructions executed by processing circuitry 124, and network interface 128 communicates signals to backend network components, such as a gateway, switch, router, Internet, Public Switched Telephone Network (PSTN), core network nodes or radio network controllers, etc.

Processing circuitry 124 may include any suitable combination of hardware and software implemented in one or more modules to execute instructions and manipulate data to perform some or all of the described functions of radio access node 120, such as the functions of determining a synchronization mode based on one or more network deployment parameters, UE position and movement parameters, current NR-PDCCH, SSB configuration, and NR-PDCCH reception criteria. Further examples of network node functionality that may be performed by processing circuitry 124 are described with respect to FIGS. 1-6, 10-14 and/or the example embodiments described below. In some embodiments, processing circuitry 124 may include, for example, one or more computers, one or more central processing units (CPUs), one or more microprocessors, one or more applications, and/or other logic. In certain embodiments, processing circuitry 124 may comprise one or more of the modules discussed with respect to FIG. 10.

Memory 126 is generally operable to store instructions, such as a computer program, software, an application including one or more of logic, rules, algorithms, code, tables, etc. and/or other instructions capable of being executed by a processor. Examples of memory 126 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 128 is communicatively coupled to processing circuitry 124, and network interface 128 may refer to any suitable device operable to receive input for radio access node 120, send output from radio access node 120, perform suitable processing of the input or output or both, communicate to other devices, or any combination of the preceding. Network interface 128 may include appropriate hardware (e.g., port, modem, network interface card, etc.) and software, including protocol conversion and data processing capabilities, to communicate through a network.

Other embodiments of radio access node 120 may include additional components beyond those shown in FIG. 9 that may be responsible for providing certain aspects of the radio access node 120's functionality, including any of the functionality described herein and/or any additional functionality (including any functionality necessary to support the embodiments described herein). Core network node 130 may comprise similar components as those shown in FIG. 9, however, a wireless interface (e.g., transceiver 122) is optional for the core network node 130. The various different types of network nodes may include components having the same physical hardware but configured (e.g., via programming) to support different radio access technologies, or may represent partly or entirely different physical components.

FIG. 10 illustrates examples of modules that can be included in radio access node 120. In certain embodiments, radio access node 120 may include any one or more of determining module(s) 1002, communication module(s) 1004, receiving module(s) 1006, and/or other suitable modules. The functionality of the modules may be integrated in a single component or separated among several components in any suitable manner. In certain embodiments, one or more of the modules may be implemented using processing circuitry 124 described with respect to FIG. 9.

The determining module 1002 may perform the processing functions of radio access node 120 (including any of the processing functions necessary to support the functionality of the radio access node/base station/access point/gNB/TRP described with reference to FIGS. 1-6, 9, 11-14 and/or the example embodiments described below). As one example, the determining module 1002 may determine a synchronization mode based on one or more network deployment parameters, UE position and movement parameters, current NR-PDCCH, SSB configuration, and NR-PDCCH reception criteria. The determining module 1002 may include analog and/or digital circuitry configured to perform any of the functions of the determining module 1002 and/or processing circuitry 124 described above. The functions of the determining module 1002 described above may, in certain embodiments, be performed in one or more distinct modules.

The communication module 1004 may perform the transmission functions of radio access node 120. As one example, the communication module 1004 may transmit synchronization signals according to the synchronization mode. The communication module 1004 may include a transmitter and/or a transceiver, such as transceiver 122 described above in relation to FIG. 9. As another example, the communication module 1004 may send information to other radio access nodes 120. The communication module 1004 may include a network interface, such as interface 128 described above in relation to FIG. 9. The communication module 1004 may include circuitry configured to transmit wireless and/or wired messages and/or signals. In particular embodiments, the communication module 1004 may receive messages and/or signals for transmission from the determining module 1002. In certain embodiments, the functions of the communication module 1004 described above may be performed in one or more distinct modules.

The receiving module 1006 may perform the receiving functions of radio access node 120. The receiving module 1006 may include a receiver and/or a transceiver, such as transceiver 122 described above in relation to FIG. 9. As another example, the receiving module 1006 may receive information from other radio access nodes 120. The receiving module 1006 may include a network interface, such as interface 128 described in relation to FIG. 9. The receiving module 1006 may include circuitry configured to receive wireless and/or wired messages and/or signals. In certain embodiments, the receiving module 1006 may include circuitry configured to receive information from memory 124 of radio access node 120. In particular embodiments, the receiving module 1006 may communicate received messages and/or signals to the determining module 1002. The functions of the receiving module 1006 described above may, in certain embodiments, be performed in one or more distinct modules.

In certain embodiments, some or all of the modules shown in FIG. 10 can be combined with one or more modules shown in FIG. 9. As just one example, certain embodiments may combine at least some of the functionality of the processing circuitry 124 (FIG. 9) with the determining module 1002 (FIG. 10).

FIG. 11 illustrates an example of a signal flow between wireless device 110 and network node 120. In step 1102 of the illustrated embodiment, network node 120 determines a synchronization mode based on one or more network deployment parameters, one or more UE position and movement parameters, current NR-PDCCH, SSB configuration, and/or NR-PDCCH reception criteria. At step 1104, network node 120 transmits synchronization signals according to the synchronization mode determined in step 1102. Wireless device 110 receives the synchronization signals and, at step 1106, determines the synchronization mode based on the system information field. At step 1108, network node 120 sends a control signal. Wireless device 110 may receive the control signal (step 1110) based on the synchronization mode determined in step 1106.

FIG. 12 illustrates an example of a signal flow between wireless device 110 and network node 120. In step 1202 of the illustrated embodiment, network node 120 determines whether an additional synchronization signal should be transmitted to one or more wireless devices. The additional synchronization signal comprises information that the one or more wireless devices 110 can use for synchronization (e.g., in addition to information that the network provides in the synchronization signal block (SSB)). In step 1204, network node 120 may transmit an indication whether the additional synchronization signal is available for use by the wireless device 110. The indication may comprise any suitable format. As an example, in certain embodiments, the indication may comprise an ON or OFF parameter to indicate the status of the additional synchronization signal. As another example, in certain embodiments, the indication may comprise information indicating a subset of wireless devices 110 for which the additional synchronization signal is available. As another example, in certain embodiments the indication may indicate a subset of PRACH preamble indices that can be used by the one or more wireless devices to request the additional synchronization signal. The indication may be transmitted in any suitable format, such as by broadcast or by dedicated control signaling.

If the additional synchronization signal is available for use, network node 120 may transmit the additional synchronization signal to wireless device 110 in step 1206. Wireless device 110 may receive the indication indicating whether the additional synchronization signal is available for use. If the additional synchronization signal is available for use, wireless device 110 may detect the additional synchronization signal at step 1208. For example, wireless device 110 detects the additional synchronization signal based at least in part on the indication received in step 1204. As an example, the wireless device 110 may perform operations for detecting the additional synchronization signal based on the indication that the additional synchronization signal is available for use (otherwise, if network node 120 indicates that the additional synchronization signal is not available for use, wireless device 110 need not perform operations for detecting the additional synchronization signal). At step 1210, wireless device 110 may synchronize with network node 120 using the additional synchronization signal.

EXAMPLE EMBODIMENTS

1. A method in a network node for synchronization signaling, the method comprising:
determining whether an additional synchronization signal should be transmitted to one or more wireless devices; and transmitting to the one or more wireless devices an indication whether the additional synchronization signal is available for use.

1b. The method of example embodiment 1, wherein in response to determining that the additional synchronization signal should be transmitted, the indication signals a presence of the additional synchronization signal to the one or more wireless devices.

1c. The method of example embodiment 1, wherein in response to determining that the additional synchronization signal should not be transmitted, the indication signals a lack of the additional synchronization signal to the one or more wireless devices.

1d. The method of example embodiment 1, further comprising transmitting a synchronization signal block (SSB) comprising information that the one or more wireless devices can use for synchronization, and wherein the additional synchronization signal comprises additional information that the one or more wireless devices can use for synchronization.

2. The method of example embodiment 1, wherein transmitting the indication comprises broadcasting the indication to the one or more wireless devices.

2b. The method of example embodiment 1 or 2, wherein transmitting the indication to the one or more wireless devices comprises transmitting the indication using one or more bits in a NR-PBCH (MIB) field in an SSB.

3. The method of any of example embodiments 1 or 2, wherein transmitting the indication to the one or more wireless devices comprises transmitting the indication using one or more bits in an RMSI field.

4. The method of example embodiment 1, wherein transmitting the indication to the group of wireless devices comprises transmitting the indication using dedicated control signaling.

5. The method of example embodiment 4, wherein the dedicated control signaling is transmitted according to a RRC protocol.

6. The method of any of example embodiments 1-5, wherein determining whether the additional synchronization signal should be transmitted is based on position and movement parameters of the one or more wireless devices.

7. The method of any of example embodiments 1-5, wherein determining whether the additional synchronization signal should be transmitted to the one or more wireless devices is based on a current NR-PDCCH and/or SSB configuration of the network node.

8. The method of any of example embodiments 1-5, wherein determining whether the additional synchronization signal should be transmitted is based on one or more network deployment parameters.

8b. The method of example embodiment 8, wherein the one or more network deployment parameters comprise at least one of:

a parameter indicating whether the network node is a silent node;

a parameter indicating whether the network node is participating in a single frequency network (SFN) transmission; and a parameter related to Doppler spread.

9. The method of any of example embodiments 1-5, wherein determining whether the additional synchronization signal should be transmitted is based on a request received from at least one of the wireless devices, the request indicating that the network node should transmit the additional synchronization signal.

10. The method of example embodiment 9, wherein the request comprises a PRACH preamble and an index of the PRACH preamble implicitly indicates the request for the network node to provide the additional synchronization signal.

10b. The method of example embodiment 10, further comprising (prior to receiving the PRACH preamble of example embodiment 10) transmitting to the one or more wireless devices information indicating a subset of PRACH preamble indices that can be used by the one or more wireless devices to request the additional synchronization signal.

11. The method of example embodiment 10, further comprising using a random access response (RAR) to transmit the additional synchronization signal to the wireless device from which the network node received the PRACH preamble having the index that implicitly indicates the request for the additional synchronization signal.

12. The method of any of example embodiments 1-11, wherein prior to transmitting the additional synchronization signal, the method further comprises determining the one or more wireless devices to which the additional synchronization signal is to be transmitted.

13. The method of example embodiment 12, where determining the group of wireless devices is based on the specific SS block (SSB) that the group of wireless devices has detected.

14. The method of example embodiment 12, where determining the group of wireless devices is based on a mobility property of the group of wireless devices.

15. The method of example embodiment 12, where determining the group of wireless devices is based on one or more hardware limitations of the one or more wireless devices.

16. The method of example embodiment 12, where determining the one or more wireless devices is based on a link budget of the one or more wireless devices.

17. The method of example embodiment 12, where determining the one or more wireless devices is based on energy limitations of the one or more wireless devices.

18. The method of example embodiment 12, where determining the one or more wireless devices is based on a proximity to the network node or other transmitting units of the one or more wireless devices.

19. The method of example embodiment 12, wherein determining the one or more wireless devices is based on one or more wireless devices being within a coverage area of the network node using a predetermined RACH preamble configuration.

20. The method of example embodiment 19, wherein the predetermined RACH preamble is format B4.

21. The method of any of example embodiments 1-20, wherein the method further comprises transmitting the additional synchronization signal to the one or more wireless devices.

22. The method of example embodiment 21, wherein transmitting the additional synchronization signal comprises transmitting the additional synchronization signal in one or more subsequent RAR windows, the one or more subsequent RAR windows occurring after a first RAR window.

23. The method of example embodiment 22, wherein configuration of the one or more subsequent RAR windows is broadcast in RMSI.

24. The method example embodiment 1, wherein transmitting the indication to the one or more wireless devices comprises transmitting the indication within the downlink control information (DCI) transmitted in PDCCH, the indication signaling that a PDSCH is allocated with an additional RAR synchronization signal.

25. The method of example embodiment 1, wherein the indication further signals a type of the additional synchronization signal.

26. The method of example embodiment 25, wherein the type of the additional synchronization signal is a synchronization sequence used.

26b. The method of example embodiment 26, wherein the synchronization sequence used is a synchronization that shares its design with an SSB synchronization but deviates from the SSB synchronization in one or more of a specific sequence or a frequency allocation.

26c. The method of example embodiment 26b. wherein a PSS of the SSB synchronization is a first m-sequence and the additional synchronization sequence is a second m-sequence of a same length as the first m-sequence but generated from a different generator state.

27. The method of any of example embodiments 1-26, wherein the one or more wireless devices correspond to a synchronization selection group ID and the network node transmits the additional synchronization signal to the one or more wireless devices based on the synchronization selection group ID.

28. The method example embodiment 1, wherein transmitting the indication to the one or more wireless devices comprises transmitting a NR-PDCCH in a special control signaling search region.

29. The method of example embodiment 28, wherein the special control signaling search region corresponds to a predefined set of resources from which the one or more wireless devices can infer that the additional synchronization signal is configured.

30. The method of example embodiment 29, wherein the predefined set of resources are PDCCH resource elements (REs).

31. The method of any of example embodiments 1-30, wherein the one or more wireless devices comprises a subset of wireless devices in a coverage area of the network node.

32. The method of any of example embodiments 1-30, wherein the group of wireless devices comprises all wireless devices in a coverage area of the network node.

33. The method of example embodiment 1, wherein transmitting the indication to the one or more wireless devices comprises transmitting the indication via during paging.

33b. The method of example embdiment 1, wherein transmitting the indication to the one or more wireless devices comprises transmitting the indication during a DRX phase.

34. A network node comprising:
processing circuitry configured to determine whether an additional synchronization signal should be transmitted to one or more wireless devices; and
an interface operably coupled to the processing circuitry, the interface is configured to transmit to the one or more wireless devices an indication whether the additional synchronization signal is available for use.

35. The network node of example embodiment 34, further operable to perform any of the methods of example embodiments 2-33.

36. A computer program product comprising a non-transitory computer readable medium storing computer readable program code, the computer readable program code operable, when executed by processing circuitry to perform any of the methods of example embodiments 1-33.

37. A method in a wireless device for receiving synchronization signaling, the method comprising:
receiving an indication from a network node, the indication signaling whether an additional synchronization signal is available for use by the wireless device.

37b. The method of example embodiment 37, further comprising detecting the additional synchronization signal based, in part, on the indication indicating that the additional synchronization signal is available for use.

37c. The method of example embodiment 37b, further comprising using the additional synchronization signal when synchronizing with the network node.

38. The method of example embodiment 37, wherein the indication is received via a broadcast from the network node.

38b. The method example embodiment 37, wherein the indication is received from the network node as one or more bits in a NR-PBCH (MTB) field in an SSB.

39. The method of any of example embodiments 37 or 38, wherein the indication is received from the network node as one or more bits in an RMSI field.

40. The method example embodiment 37, wherein the indication is received from the network node using dedicated control signaling.

41 The method of example embodiment 40, wherein the dedicated control signaling is received according to a RRC protocol.

42. The method of example embodiment 37, further comprising: transmitting a request to the network node, the request indicating that the network node should transmit the additional synchronization signal.

43. The method of example embodiment 42, wherein the request comprises a PRACH preamble and an index of the PRACH preamble implicitly indicates the request for the network node to provide the additional synchronization signal.

43b. The method of example embodiment 43, further comprising (prior to transmitting the PRACH preamble of example embodiment 43) receiving from the network node information indicating a subset of PRACH preamble indices that can be used to request the additional synchronization signal.

44. The method of any of example embodiments 42-43, further comprising receiving the additional synchronization signal from the network node using a random access response (RAR) in response to transmitting the request.

45. The method of any of example embodiments 37-44, wherein detecting the additional synchronization signal comprises detecting the additional synchronization signal in one or more subsequent RAR windows, the one or more subsequent RAR windows occurring after a first RAR window.

46. The method of example embodiment 45, wherein a configuration of the one or more subsequent RAR windows is received in RMSI.

47. The method example embodiment 37, wherein receiving the indication comprises receiving the indication within the downlink control information (DCI) received in PDCCH, the indication signaling that a PDSCH is allocated with an additional RAR synchronization signal.

48. The method of example embodiment 37, wherein the indication further signals a type of the additional synchronization signal.

49. The method of example embodiment 48, wherein the type of the additional synchronization signal is a synchronization sequence used by the network node.

49b. The method of example embodiment 49, wherein the synchronization sequence used is a synchronization that shares its design with an SSB synchronization but deviates from the SSB synchronization in one or more of a specific sequence or a frequency allocation.

50. The method of example embodiment 37, wherein the wireless device is associated with a synchronization selection group ID and the method further comprising receiving the additional synchronization signal based on the association of the wireless device with the synchronization selection group ID.

51. The method example embodiment 37, wherein receiving the indication from the network node comprises receiving a NR-PDCCH in a special control signaling search region.

52. The method of example embodiment 51, wherein the special control signaling search region corresponds to a predefined set of resources, the method further comprising, inferring, from the predefined set of resources, whether the additional synchronization signal is configured.

53. The method of example embodiment 52, wherein the predefined set of resources are PDCCH REs 54. The method example embodiment 37, wherein receiving the indication from the network node comprises receiving the indication during paging.

54b. The method of example embodiment 37, wherein receiving the indication from the network node comprises receiving the indication during a DRX phase.

55. A wireless device, comprising:
a transceiver configured to: receive an indication from a network node, the indication signaling whether an additional synchronization signal is available for use by the wireless device.

55b. The wireless device of example embodiment 55, wherein processing circuitry operably coupled to the interface is configured to detect the additional synchronization signal based, in part, on the indication indicating that the additional synchronization signal is available for use.

55c. The wireless device of example embodiment 55, wherein processing circuitry is further configured to synchronize with the network node using the additional synchronization signal.

56. The wireless device of example embodiment 55, further operable to perform any of the methods of example embodiments 37-54.

57. A computer program product comprising a non-transitory computer readable medium storing computer readable program code, the computer readable program code operable, when executed by processing circuitry to perform any of the methods of example embodiments 37-54.

58. Any of example embodiments 1-57, wherein the method/processing circuitry/transceiver/program code determining a synchronization mode for a control signal, based on information received from another node, and/or a based on the application of a rule.

FIG. 13 illustrates an example of a method that may be performed by network node 120, in accordance with certain embodiments. In some embodiments, the method may optionally include steps 1302 and/or 1304. At step 1302, the method transmits information from the network node to one or more wireless devices 110. The information transmitted in step 1302 indicates a subset of PRACH preamble indices that can be used by the one or more wireless devices to request an additional synchronization signal. At step 1304, the method receives a request from one or more of the wireless devices. The request indicates that the network node should transmit the additional synchronization signal. For example, the request may comprise a PRACH preamble associated with an index indicated in step 1302, which implicitly indicates the request for the network node to provide the additional synchronization signal.

At step 1306, the method determines whether the additional synchronization signal should be transmitted to one or more of the wireless devices. As an example, the method may determine whether the additional synchronization signal should be transmitted based at least in part on receiving the request from at least one of the wireless devices in step 1304. As further examples, the method may determine whether the additional synchronization signal should be transmitted based on one or more of the following: position and movement parameters of the one or more wireless devices, a current configuration of an NR-PDCCH of the network node, a current configuration of an SSB of the network node, and/or one or more network deployment parameters (e.g., a parameter indicating whether the network node is a silent node, a parameter indicating whether the network node is participating in SFN transmission, and/or a parameter related to Doppler spread). Further examples are described above, for example, with respect to "Determining when to activate additional synchronization signal."

At step 1308, the method transmits an indication to the one or more wireless devices. The indication indicates whether the additional synchronization signal is available for use. The indication may signal a presence of the additional synchronization signal (in response to determining at step 1306 that the additional synchronization signal should be transmitted) or a lack of the additional synchronization signal (in response to determining at step 1306 that the additional synchronization signal should not be transmitted). Examples of transmitting the indication are provided above with respect to "Determining the presence of the additional synchronization signal." The indication of step 1308 may be transmitted during paging, during a DRX phase, or at any other suitable time, for example, depending on the manner being used to transmit the indication.

The indication of step 1308 may be transmitted in any suitable manner. In some embodiments, the method broadcasts the indication whether the additional synchronization signal is available. For example, the indication may be broadcast in a field carried by the NR-PBCH. In some embodiments, the method uses an MIB field in an SSB to provide the indication. Optionally, the method may use different SSBs to configure different indications such that the indication of the additional synchronization signal received by a particular wireless device depends on which of the SSBs is detected by that wireless device. In some embodiments, the method uses one or more bits in an RMSI field to provide the indication whether the additional synchronization signal is available. In some embodiments, the method uses dedicated control signaling, such as RRC signaling, to transmit the indication whether the additional synchronization signal is available. In some embodiments, the method uses a PDCCH to transmit the indication in DCI. The indication may indicate that a PDSCH is allocated with an additional RAR synchronization signal. In some embodiments, transmitting the indication to the one or more wireless devices comprises transmitting an NR-PDCCH in a special control signaling search region. The special control signaling search region may correspond to a predefined set of resources (such as PDCCH resource elements) from which the one or more wireless devices can infer that the additional synchronization signal is configured.

In some embodiments, the indication transmitted in step 1308 further signals a type of the additional synchronization signal. The type of the additional synchronization signal may comprise a synchronization sequence used, such as a synchronization that shares its design with an SSB synchronization but deviates from the SSB synchronization in one or more of a specific sequence or a frequency allocation.

If at step 1306 the method determined that the additional synchronization signal should be transmitted, the method may further comprise transmitting the additional synchronization signal at step 1310. As one example, if at step 1304 the method received a PRACH preamble having an index that implicitly indicates the request for the additional synchronization signal, certain embodiments may use the RAR to transmit the additional synchronization signal to the wireless device from which the PRACH preamble was received. In some embodiments, the additional synchronization signal is transmitted in one or more subsequent RAR windows, the one or more subsequent RAR windows occurring after a first RAR window. In some embodiments, the configuration of the one or more subsequent RAR windows is broadcast in RMSI.

FIG. 14 illustrates an example of a method that may be performed by network node 120, in accordance with certain embodiments. At step 1402, the method determines that an additional synchronization signal should be transmitted to one or more wireless devices 110. Examples of information that the method may use to make the determination are discussed above, for example, with respect to "Determining when to activate additional synchronization signal" and step 1306 of FIG. 13. At step 1404, the method transmits an indication that the additional synchronization signal is available for use. Examples of transmitting the indication are described above, for example, with respect to "Determining the presence of the additional synchronization signal" and step 1308 of FIG. 13. In certain embodiments, the method may optionally include steps 1406, 1408, and 1410. At step 1406, the method determines the one or more wireless devices to which the additional synchronization signal is to be transmitted. Examples of determining which wireless devices should be provided with the additional synchronization signal are described above with respect to "Determining the Relevant Group of UEs." For example, the additional synchronization signal may be sent to all wireless devices in a coverage area of the network node or to a subset comprising one or more of the wireless devices in the coverage area of the network node. In certain embodiments, determining the group of wireless devices is based at least in part on one or more of the following: a mobility property of the group of wireless devices, one or more hardware limitations of the one or more wireless devices, a link budget of the one or more wireless devices, energy limitations of the one or more wireless devices, a proximity of the one or more wireless devices to the network node or other transmitting units, a predetermined RACH preamble configuration used by one or more of the wireless devices within a coverage area of the network node (such as the use of RACH preamble format B4), and/or membership of the one or more wireless devices to a synchronization selection group ID.

At step 1408, the method transmits an SSB to one or more of the wireless devices. The SSB comprises information that the one or more wireless devices can use for synchronization. Although FIG. 14 shows an example in which the SSB is transmitted after steps 1402, 1404, and 1406, the SSB can be transmitted before step 1402, before step 1404, or before step 1406, depending on the embodiment.

At step 1410, the method comprises transmitting the additional synchronization signal to one or more of the wireless devices. With respect to embodiments for which step 1406 is included, step 1410 comprises transmitting the additional synchronization signal to the one or more wireless devices determined in step 1406. The one or more wireless devices determined in step 1406 may correspond to all or a subset of the wireless devices within coverage of the network node. As an example, if at step 1406 the method determines the transmit the additional synchronization signal to a subset of wireless devices associated with a synchronization selection group ID, the method may transmit the additional synchronization signal to wireless devices associated with the determined synchronization selection group ID at step 1410. The additional synchronization signal comprises additional information that the one or more wireless devices can use for synchronization. In some embodiments, the SSB transmitted in step 1408 comprises a first m-sequence (e.g., the primary sequence of the SSB) and the additional synchronization signal transmitted at step 1410 comprises a second m-sequence that is the same length as the first m-sequence, but is generated from a different generator state than the first m-sequence.

FIG. 15, which includes FIG. 15A and FIG. 15B, illustrates an example of a method that may be performed by wireless device 110, in accordance with certain embodiments. At step 1502, the method receives an indication from a network node 120. The indication indicates whether the additional synchronization signal is available for use. The indication may signal a presence of the additional synchronization signal or a lack of the additional synchronization signal. Examples of receiving the indication from the network node are provided above with respect to "Determining the presence of the additional synchronization signal." The indication of step 1502 may be received during paging, during a DRX phase, or at any other suitable time.

The indication of step 1502 may be received in any suitable manner. In some embodiments, the method receives the indication whether the additional synchronization signal is available in a broadcast. In some embodiments, the method receives the indication in an MIB field of an SSB. In some embodiments, the method receives the indication in an RMSI field. In some embodiments, the method uses dedicated control signaling, such as RRC signaling, to receive the indication whether the additional synchronization signal is available. In some embodiments, the method receives the indication in DCI received via a PDCCH. The indication may indicate that a PDSCH is allocated with an additional RAR synchronization signal. In some embodiments, the indication is received in a special control signaling search region of an NR-PDCCH. The special control signaling search region may correspond to a predefined set of resources (such as PDCCH resource elements) from which the wireless device can infer that the additional synchronization signal is configured.

In some embodiments, the indication received in step 1502 further signals a type of the additional synchronization signal. The type of the additional synchronization signal may comprise a synchronization sequence used, such as a synchronization that shares its design with an SSB synchronization but deviates from the SSB synchronization in one or more of a specific sequence or a frequency allocation.

At step 1504, the method receives an SSB from the network node. The SSB comprises information that the wireless device can use for performing the synchronization. If the additional synchronization signal is available for use, the method receives the additional synchronization signal from the network node at step 1506. In some embodiments, the SSB received in step 1504 comprises a first m-sequence (e.g., the primary sequence of the SSB) and the additional synchronization signal received in step 1506 comprises a second m-sequence that is the same length as the first m-sequence, but is generated from a different generator state than the first m-sequence.

In some embodiments, the method may optionally include step 1508 in which a determination is made whether the wireless device belongs to a group of wireless devices for which the additional synchronization signal is available. As examples, whether the wireless device belongs to the group depends at least in part on one or more of the following: a synchronization selection group ID of the wireless device, a mobility property of the wireless devices, one or more hardware limitations of the wireless device, a link budget of the wireless device, energy limitations of the wireless device, proximity of the wireless device to the network node or other transmitting units, or a predetermined RACH preamble configuration used by the wireless device (such as format B4). In some embodiments, the method implicitly determines that the wireless device belongs to the group of wireless devices for which the additional synchronization signal is available based on receiving an indication that the additional synchronization signal is available (in step 1502) and/or based on receiving the additional synchronization signal (in step 1506).

At step 1510, the method performs synchronization using the additional synchronization signal. For example, the additional synchronization signal may be used in response to receiving an indication that the additional synchronization signal is available for use in step 1502, receiving the additional synchronization signal in step 1506, and (in some embodiments) determining in step 1508 that the wireless device belongs to a group of wireless devices for which the additional synchronization signal is available. Performing synchronization may comprise decoding a channel that has been transmitted by the network node, such as the NR-PDCCH.

At step 1512, the method performs synchronization without the additional synchronization signal. As an example, synchronization may be performed without the additional synchronization signal in response to receiving an indication that the additional synchronization signal is not available for use in step 1502. As other examples, in some embodiments, synchronization may be performed without the additional synchronization signal in response to determining in step 1508 that the wireless device does not belong to a group of wireless devices for which the additional synchronization signal is available or in response to not receiving the additional synchronization signal. Performing synchronization may comprise decoding a channel that has been transmitted by the network node, such as the NR-PDCCH.

FIG. 16 illustrates an example of a method that may be performed by wireless device 110, in accordance with certain embodiments. In some embodiments, the method includes step 1602 wherein the method receives information indicating a subset of PRACH preamble indices that can be used by the wireless device to request an additional synchronization signal. At step 1604, the method determines whether to request the additional synchronization signal from the network node. In some embodiments, the determination is based at least in part on one or more of the following: an estimated speed or Doppler spread of the wireless device, and SNR or SINR associated with the wireless device, a frequency offset estimate, or an estimation of timing or frequency offset variance.

If at step 1604 the method determines not to request the additional synchronization signal, in some embodiments, the method may perform synchronization (step 1610) without the use of the additional synchronization signal. Or, in some embodiments, the method may perform synchronization (step 1610) using the additional synchronization signal (e.g., in the case that the network node determines to provide the additional synchronization signal on its own/without requiring the wireless device to request the additional synchronization signal).

If at step 1604 the method determines to request the additional synchronization signal, the method transmits a request to the network node in step 1606. The request indicates that the network node should transmit the additional synchronization signal. In some embodiments, the request is transmitted in the form of a PRACH preamble associated with an index received in step 1602, which implicitly indicates the request for the network node to provide the additional synchronization signal. Although not shown in FIG. 16, in some embodiments, the network node may respond by sending an indication whether the additional synchronization signal is available for use, in which case the method comprises receiving the indication (e.g., similar to step 1502 of FIG. 15A).

At step 1608, the method receives the additional synchronization signal from the network node. For example, if a PRACH preamble was used to request the additional synchronization signal, the additional synchronization signal may be received in the RAR.

In some embodiments, the wireless device receives the RAR comprising the additional synchronization signal after a first RAR window/in one or more subsequent RAR windows. In some embodiments, configuration of the one or more subsequent RAR windows is received in RMSI broadcast by the network node.

At step 1610, the method performs synchronization. In some embodiments, synchronization may be performed using synchronization information obtained in an SSB and additional synchronization information received in the additional synchronization signal received in step 1608.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. SSB-based synchronization was given as an example in this disclosure as it is expected to be the most common example. However, there may be problems with synchronization signals other than SSB, where the additional synchronization approach listed in this disclosure can be useful.

In addition to NR-PDCCH reception, the subsequent NR-PDSCH decoding can also take advantage of the improved synchronization quality offered by the additional synchronization signal. In some embodiments, the criteria for configuring additional synchronization signals may be based on NR-PDSCH reception requirements.

Embodiments of the present disclosure are useful not only for Paging, RAR, RMSI, CSI-RS but also for UEs in active mode, e.g., in data reception mode, monitoring for the presence of scheduling NR-PDCCH, if long time may pass between subsequent NR-PDCCH/PDSCH transmissions. In some embodiments, there might be several types of additional synchronization signals based on the extent of the time and frequency offsets inaccuracy that needs to be resolved. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. For example, in some embodiments, one or more of the steps illustrated in dashed-line boxes may be omitted from the methods of FIGS. 13-16. Additionally, steps may be performed in any suitable order. Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

Although this disclosure has been described in terms of certain embodiments, alterations and permutations of the embodiments will be apparent to those skilled in the art.

Accordingly, the above description of the embodiments does not constrain this disclosure. Other changes, substitutions, and alterations are possible without departing from the spirit and scope of this disclosure, as defined by the following claims.

The invention claimed is:

1. A method performed by a network node configured to transmit a synchronization signal block (SSB) to a wireless device, the method comprising:
    transmitting, to the wireless device, an indication that a first set of synchronization signals is available for use for synchronization;
    transmitting, to the wireless device, an indication whether an additional synchronization signal not included in the first set of synchronization signals is available for use for synchronization, wherein the additional synchronization signal is a different type of synchronization signal than SSB, wherein the indication is transmitted via downlink control information (DCI), wherein the indication is transmitted during paging, and wherein the indication is transmitted while the wireless device is in idle state or inactive state; and
    transmitting the additional synchronization signal to the wireless device.

2. A network node configured to transmit a synchronization signal block (SSB) to a wireless device, the network node comprising:
    processing circuitry configured to cause the network node to:
        transmit, to the wireless device, an indication whether an additional synchronization signal is available for use for synchronization, wherein the additional synchronization signal is a different type of synchronization signal than SSB, wherein the indication is transmitted via downlink control information (DCI), wherein the indication is transmitted during paging, and wherein the indication is transmitted while the wireless device is in idle state or inactive state; and
        transmit the additional synchronization signal to the wireless device.

3. A method performed by a wireless device configured to use a synchronization signal block (SSB) for synchronization, the method comprising:
    receiving, from a network node, an indication whether an additional synchronization signal is available for use, wherein the additional synchronization signal is a different type of synchronization signal than SSB, wherein the indication is received via downlink control information (DCI), wherein the indication is received during paging, and wherein the indication is received while the wireless device is in idle state or inactive state;
    in response to the indication indicating that the additional synchronization signal is available for use, receiving the additional synchronization signal from the network node for synchronization using the additional synchronization signal; and
    in response to the indication indicating that the additional synchronization signal is not available for use, performing synchronization using the SSB without the additional synchronization signal.

4. A wireless device configured to use a synchronization signal block (SSB) for synchronization, the wireless device comprising:
    processing circuitry configured to cause the wireless device to:
        receive, from a network node, an indication whether an additional synchronization signal is available for use, wherein the additional synchronization signal is a different type of synchronization signal than SSB, wherein the indication is received via downlink control information (DCI), wherein the indication is received during paging, and wherein the indication is received while the wireless device is in idle state or inactive state; and
        in response to the indication indicating that the additional synchronization signal is available for use, receive the additional synchronization signal from the network node for synchronization using the additional synchronization signal; and
        in response to the indication indicating that the additional synchronization signal is not available for use, perform synchronization using the SSB without the additional synchronization signal.

* * * * *

UNITED STATES PATENT AND TRADEMARK OFFICE
CERTIFICATE OF CORRECTION

| | |
|---|---|
| PATENT NO. | : 12,101,728 B2 |
| APPLICATION NO. | : 17/875588 |
| DATED | : September 24, 2024 |
| INVENTOR(S) | : Irukulapati et al. |

Page 1 of 1

It is certified that error appears in the above-identified patent and that said Letters Patent is hereby corrected as shown below:

In the Specification

In Column 3, Line 22, delete "5v %" and insert -- 5% --, therefor.

In Column 16, Line 7, delete "110a-10b" and insert -- 110a-110b --, therefor.

In Column 25, Line 48, delete "embdiment" and insert -- embodiment --, therefor.

In Column 26, Line 17, delete "(MTB)" and insert -- (MIB) --, therefor.

Signed and Sealed this
Twenty-second Day of April, 2025

Coke Morgan Stewart
*Acting Director of the United States Patent and Trademark Office*